US011502860B2

(12) United States Patent
Casas et al.

(10) Patent No.: US 11,502,860 B2
(45) Date of Patent: Nov. 15, 2022

(54) AUDIO GROUP IDENTIFICATION FOR CONFERENCING

(71) Applicant: BabbleLabs LLC, Wilmington, DE (US)

(72) Inventors: Raul Alejandro Casas, Doylestown, PA (US); Samer Hijazi, San Jose, CA (US); Hua Mu, Orlando, FL (US); Marcin Ciolek, Gdansk (PL); Dror Maydan, Palo Alto, CA (US); Christopher Rowen, Santa Cruz, CA (US); Erik Panu, Los Gatos, CA (US)

(73) Assignee: BabbleLabs LLC, Wilmington, DE (US)

( * ) Notice: Subject to any disclaimer, the term of this patent is extended or adjusted under 35 U.S.C. 154(b) by 322 days.

(21) Appl. No.: 16/807,743

(22) Filed: Mar. 3, 2020

(65) Prior Publication Data
US 2021/0144021 A1 May 13, 2021

Related U.S. Application Data

(60) Provisional application No. 62/932,445, filed on Nov. 7, 2019.

(51) Int. Cl.
H04L 12/18 (2006.01)
G10L 25/78 (2013.01)
H04M 9/02 (2006.01)
G06F 3/16 (2006.01)
H04M 3/56 (2006.01)

(52) U.S. Cl.
CPC .......... *H04L 12/1813* (2013.01); *G06F 3/165* (2013.01); *G10L 25/78* (2013.01); *H04M 3/568* (2013.01); *H04M 9/02* (2013.01)

(58) Field of Classification Search
None
See application file for complete search history.

(56) References Cited

U.S. PATENT DOCUMENTS

| 10,448,154 | B1* | 10/2019 | Zhan ..................... G10L 21/028 |
| 2011/0051940 | A1* | 3/2011 | Ishikawa ........... H04L 12/40013 |
| | | | 381/22 |
| 2014/0242959 | A1* | 8/2014 | Virolainen ............ H04M 9/082 |
| | | | 455/416 |
| 2015/0124950 | A1 | 5/2015 | Koenig |
| 2019/0173687 | A1* | 6/2019 | MacKay ................. G10L 17/00 |

OTHER PUBLICATIONS

PCT Search Report and Written Opinion dated Mar. 1, 2021 for PCT application No. PCT/US2020/059356, 13 pages.

(Continued)

*Primary Examiner* — Hemant S Patel
(74) *Attorney, Agent, or Firm* — Lee & Hayes, P.C.

(57) ABSTRACT

Systems and methods are disclosed for audio group identification for conferencing. For example, methods may include joining a conference call using a network interface; accessing an audio signal that has been captured using a microphone; detecting a control signal in the audio signal; and, responsive to detection of the control signal, invoking modification of an audio path of the conference call.

38 Claims, 17 Drawing Sheets

(56) References Cited

OTHER PUBLICATIONS

Crestron, Crestron Flex Insider for Zoom Room Systems, available at https://support.crestron.com/app/answers/detail/a_id/1000124, updated Sep. 17, 2020, 8 pages.
Barolo, Dell for Zoom Rooms: A Wining Combo for Zoomers, dated Mar. 15, 2018, available at https://blog.zoom.us/dell-zoom-rooms-winning-combo-zoomers/, 3 pages.
Google, Choosing the right API, Nearby Connections, available at https://developers.google.com/nearby/overview, updated Nov. 28, 2018, 2 pages.
Doherty, Hands on with Zoom's Latest Enhancements, available at https://www.linkedin.com/pulse/hands-zooms-latest-enhancements-alex-doherty/, accessed on Oct. 1, 2020, 4 pages.
Deshotels, Inaudible Sound as a Covert Channel in Mobile Devices, 2014, 9 pages.
Zoom, Direct Sharing in Zoom Rooms, available at https://support.zoom.us/hc/en-us/articles/214629303-Direct-Share-with-Zoom-Rooms, accessed on Oct. 1, 2020, 5 pages.
Zoom, Audio Echo Elimination with Proximity Detection, available at https://support.zoom.us/hc/en-us/articles/216281983-Audio-echo-elimination-with-proximity-detection, accessed at Oct. 1, 2020, 2 pages.
Roy et al, Back Door: Making Microphones Hear Inaudible Sounds, MobiSys 20'17, Jun. 19-23, 2017, Niagara Falls, NY, © 2017 Copyright held by the owner/author(s). Publication rights licensed to ACM.ISBN 978-1-4503-4928-4/17/06, 13 pages.
International Preliminary Report on Patentability for PCT Application: PCT/US2020/059356, dated May 19, 2022, 8 pages.

* cited by examiner

AUDIO GROUP IDENTIFICATION FOR CONFERENCING

CROSS REFERENCE TO RELATED APPLICATIONS

This application claims the benefit of U.S. Provisional Application No. 62/932,445, filed Nov. 7, 2019, the contents of each of which are incorporated by reference herein in their entirety.

TECHNICAL FIELD

This disclosure relates to audio group identification for conferencing.

BACKGROUND

Conferencing software enables groups of two of more people to speak with each other from multiple remote locations via the exchange of communications signals over a network (e.g., an internet protocol network) between computing devices of the participants. In some cases, video and audio signals are passed between the respective computing devices of the participants. For example, audio signals of a conference call may be routed through a server device called a conference bridge, which may mix audio streams from multiple participants before sending a copy of the combined remote audio streams to each participant's computing device. By leaving a participant's own audio stream out of the mixed audio that is sent to that participant a potentially unstable audio feedback loop may be avoided in many cases.

SUMMARY

Disclosed herein are implementations of audio group identification for conferencing.

In a first aspect, the subject matter described in this specification can be embodied in systems that include a microphone, a network interface, and a processing apparatus that is configured to join a conference call using the network interface; access an audio signal that has been captured using the microphone; detect a control signal in the audio signal; and, responsive to detection of the control signal, invoke modification of an audio path of the conference call.

In a second aspect, the subject matter described in this specification can be embodied in methods that include joining a conference call using a network interface; accessing an audio signal that has been captured using a microphone; detecting a control signal in the audio signal; and, responsive to detection of the control signal, invoking modification of an audio path of the conference call.

In a third aspect, the subject matter described in this specification can be embodied in a non-transitory computer-readable storage medium. The non-transitory computer-readable storage medium may include executable instructions that, when executed by a processor, facilitate performance of operations, including joining a conference call using a network interface; accessing an audio signal that has been captured using a microphone; detecting a control signal in the audio signal; and responsive to detection of the control signal, invoking modification of an audio path of the conference call.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
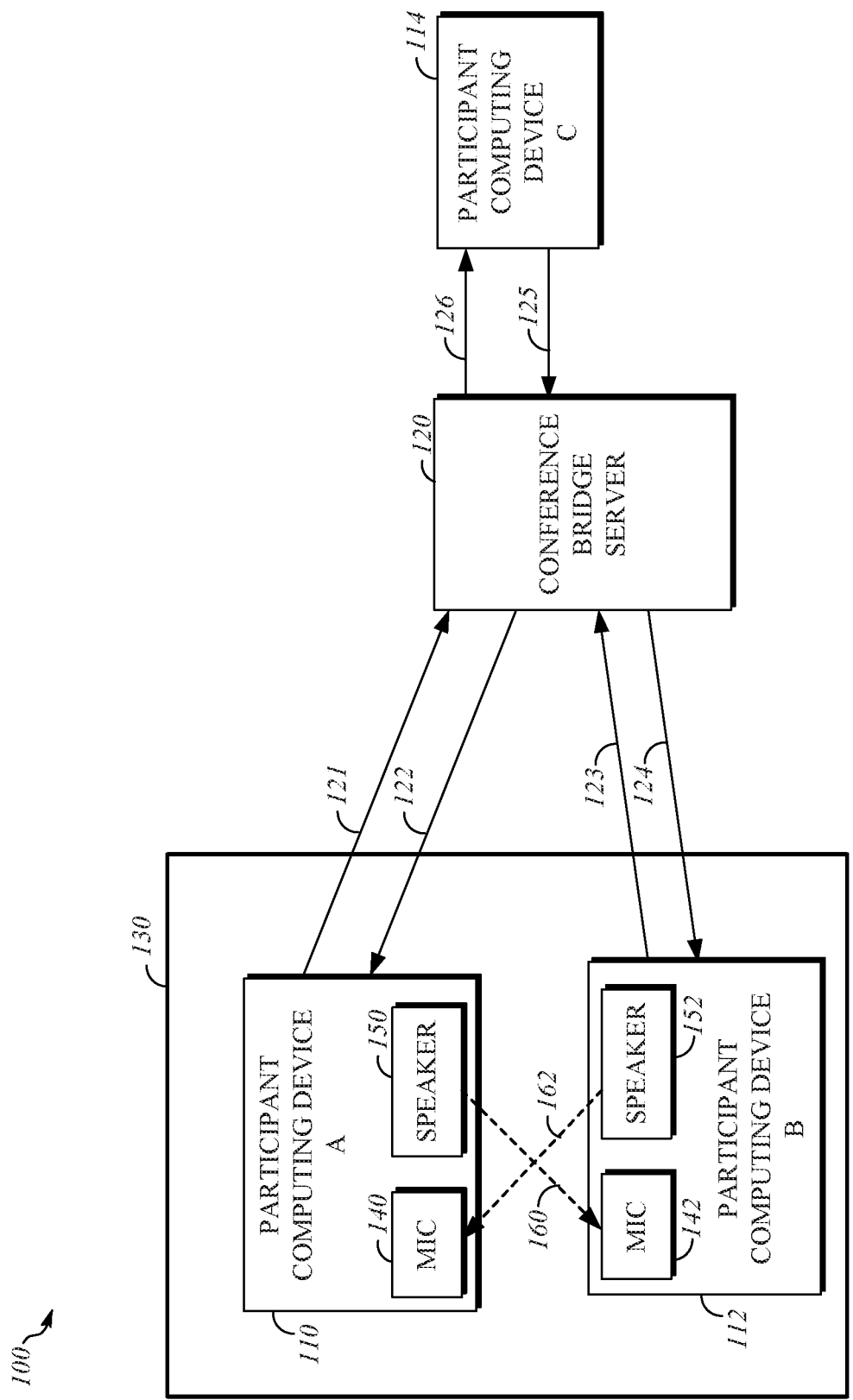
FIG. 1 is a block diagram of an example of a system for conducting a conference call with audio group identification.

This document includes disclosure of systems and methods for audio group identification for conferencing. Conventional conference call infrastructure (e.g., conference bridge servers and/or conference call client software instances) may assume that each participant computing device (e.g., a laptop, a tablet, a smartphone, or a smart speaker) is operating in a distinct location with no audio coupling between the participant computing devices outside of the linking audio streams provided by the conference call infrastructure. When conference participant computing devices are actually located close enough to each other for an audio coupling between the devices to occur (i.e., capturing sounds from the speaker of one participant with the microphone of another participant), they can be said to be sharing an audio environment (e.g., located in the same room). In some implementations, one or more control channels in audio signals played as sound waves using a speaker of a conference participant computing device may be used to announce presence in an audio environment (e.g., in a room). A participant computing device may be configured to detect control signals on the one or more control channels using a microphone. Based on detection of these control signals, the participant computing devices may infer that they are sharing an audio environment and thus identify themselves as members of an audio group within the conference call that may experience distortions arising from unexpected audio couplings between its member devices. The audio quality distortions may then be mitigated or eliminated by modifying an audio path of the conference call (e.g., muting or otherwise changing a gain of a speaker or a microphone of one or more group members, or configuring a conference bridge to avoid mixing audio streams input by audio group members into audio streams output to the audio group members).

In some implementations, the multiple conference calls operating in a shared audio environment (e.g., in a same room) may be supported by dynamically allocating different control channels to different conference calls. For example, control channel information may be transmitted to all conference participants via the conference call infrastructure. For example, control channel information may be transmitted in a control channel within the audio streams passed to conference participants by the conference call infrastructure (e.g., as in-band audio signals). For example, control channel information may be transmitted to participants in out-of-band signaling (e.g., using a transmission control protocol (TCP) session).

The proposed techniques and systems for audio group identification for conferencing may offer advantages over conventional audio conferencing systems. For example, audio quality on a conference call may be enhanced where audio distortions such as multipath, echo, and/or unstable howling are mitigated or eliminated by identifying when conference participants are sharing an audio environment and modifying one or more audio paths of the conference call to address these unexpected audio couplings between the participant computing devices. In some implementations, control channels may be dynamically allocated to enable multiple conference calls to perform audio group identification in the same audio environment, thus providing multi-call support.

Implementations are described in detail with reference to the drawings, which are provided as examples to enable those skilled in the art to practice the disclosed technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a block diagram of an example of a system 100 for conducting a conference call with audio group identification. The system 100 includes three participant computing devices (110, 112, and 114) that have joined a conference call that is managed by a conference bridge server 120. For example, the participant computing device 110 may be a laptop, a tablet, a smartphone, a smart speaker, or another computing device that is configured to provide an audio interface including a speaker and a microphone and operate as a conference call client or endpoint. For example, the participant computing device 110 may be system 300 of FIG. 3A or the system 330 of FIG. 3B. For example, the conference bridge server 120 may communicate with the participant computing devices (110, 112, and 114) via an electronic communications network (e.g., an Internet Protocol (IP) network). By default, the conference bridge server 120 may be configured to receive an input audio stream 121 from the participant computing device 110, transmit an output audio stream 122 to the participant computing device 110, receive an input audio stream 123 from the participant computing device 112, transmit an output audio stream 124 to the participant computing device 112, receive an input audio stream 125 from the participant computing device 114, and transmit an output audio stream 126 to the participant computing device 114; where the output audio stream 122 is a mix of the input audio stream 123 and the input audio stream 125, the output audio stream 124 is a mix of the input audio stream 121 and the input audio stream 125, and the output audio stream 126 is a mix of the input audio stream 121 and the input audio stream 123. However, in this example, two of the participant computing devices (110 and 112) are located in a common audio environment 130 (e.g., a room) such that there is audio coupling between the two devices outside of the conference call infrastructure.

The participant computing device 110 includes a microphone 140 and a speaker 150, and the participant computing device 112 includes a microphone 142 and a speaker 152. For example, sounds 160 generated by the speaker 150 when it is used to play audio signals may be captured by the microphone 142, and sounds 162 generated by the speaker 152 when it is used to play audio signals may be captured by the microphone 140. This audio coupling between the participant computing device 110 and the participant computing device 112 gives rise to audio paths in the conference call that may be undesirable because they can cause audio distortions, such as multipath, feedback loops, echo, and/or unstable howling conditions. To mitigate or avoid these problems, the participant computing devices (110, 112, and/or 114) may be configured to identify audio groups consisting of conference participants that are located within a respective common audio environment. In the example of FIG. 1, the techniques described herein may identify the participant computing device 110 and the participant computing device 112 as being members of an audio group because they are both participants in the same conference call and are both located in the audio environment 130.

Once an audio group has been identified, corrective measures may be taken to mitigate or eliminate these audio distortions by modifying an audio path of the conference call. For example, a speaker (e.g., the speaker 150) and/or a microphone (e.g., the microphone 140) in the audio environment may be muted, or the conference bridge server 120 may be configured to stop mixing the input audio streams from audio group members into each other's output audio streams. In some implementations, an audio path may be modified by attenuating audio signals on a link in the audio path (e.g., reducing a volume parameter of a speaker or the pickup gain of microphone). For example, the participant computing devices (110, 112, and/or 114) may be configured to implement the process 400 to identify any audio groups and make corrective modifications of audio paths of the conference call.

Figure 2:
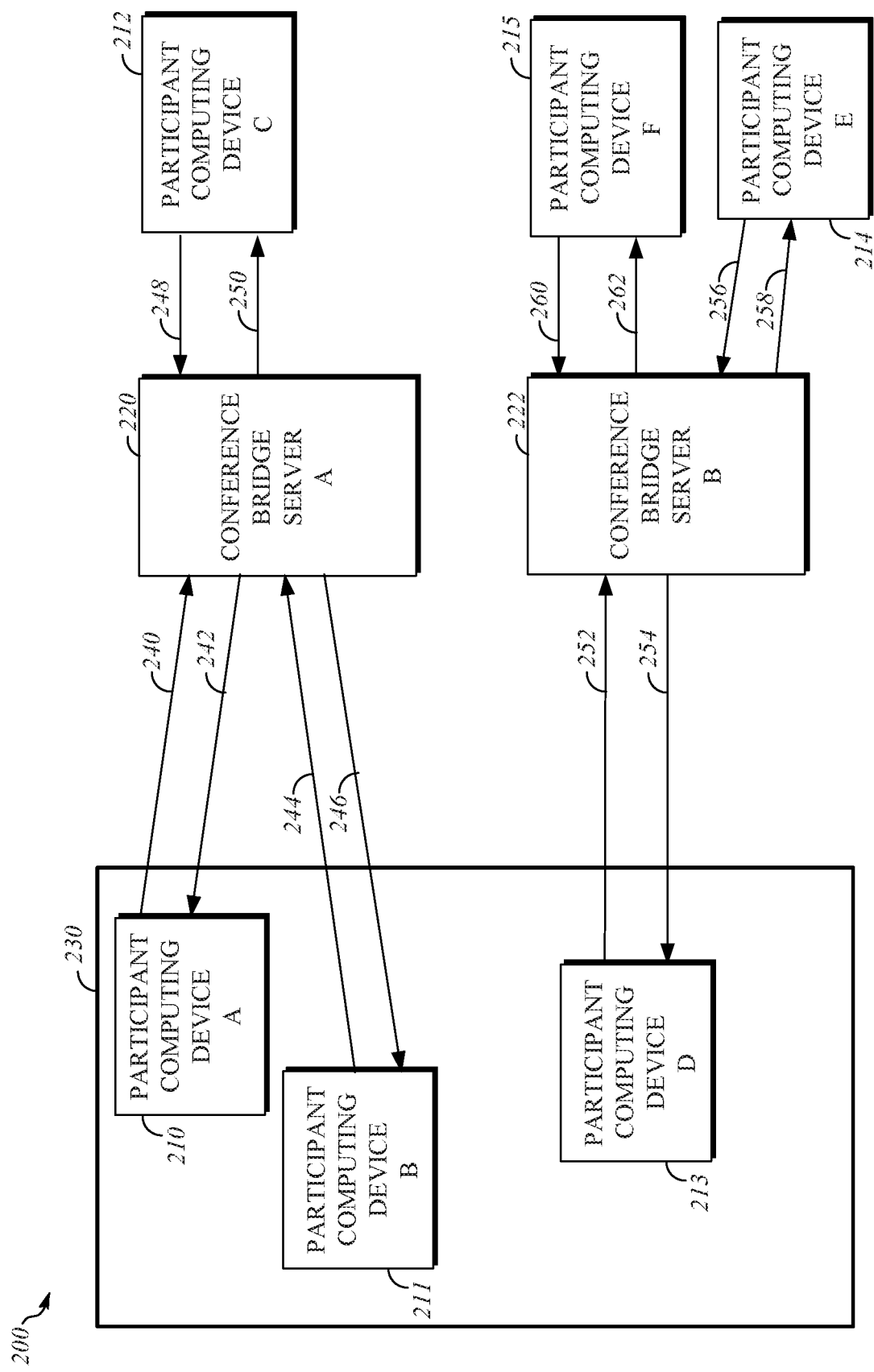
FIG. 2 is a block diagram of an example of a system for conducting two conference calls with audio group identification that share at least one audio environment.

FIG. 2 is a block diagram of an example of a system 200 for conducting two conference calls with audio group identification that share at least one audio environment. The system 200 includes six participant computing devices (210, 211, 212, 213, 214, and 215) and two conference bridge servers (220 and 222). The conference bridge server 220 manages a first conference that has been joined by the participant computing device 210, the participant computing device 211, and the participant computing device 212. The conference bridge server 222 manages a second conference that has been joined by the participant computing device 213, the participant computing device 214, and the participant computing device 215. For example, the participant computing device 210 may be system 300 of FIG. 3A or the system 330 of FIG. 3B. By default, the conference bridge server 220 may be configured to receive an input audio stream 240 from the participant computing device 210, transmit an output audio stream 242 to the participant computing device 210, receive an input audio stream 244 from the participant computing device 211, transmit an output audio stream 246 to the participant computing device 211, receive an input audio stream 248 from the participant computing device 212, and transmit an output audio stream 250 to the participant computing device 212; where the output audio stream 242 is a mix of the input audio stream 244 and the input audio stream 248, the output audio stream 246 is a mix of the input audio stream 240 and the input audio stream 248, and the output audio stream 250 is a mix of the input audio stream 240 and the input audio stream 244. By default, the conference bridge server 222 may be configured to receive an input audio stream 252 from the participant computing device 213, transmit an output audio stream 254 to the participant computing device 213, receive an input audio stream 256 from the participant computing device 214, transmit an output audio stream 258 to the participant computing device 214, receive an input audio stream 260 from the participant computing device 215, and transmit an output audio stream 262 to the participant computing device 215; where the output audio stream 254 is a mix of the input audio stream 256 and the input audio stream 260, the output audio stream 258 is a mix of the input audio stream 252 and the input audio stream 260, and the output audio stream 262 is a mix of the input audio stream 252 and the input audio stream 256. However, in this example, three of the participant computing devices (210, 211, and 213) are located in a common audio environment 230 (e.g., a room) such that there is audio coupling between the three devices outside of the conference call infrastructure. If both the first conference call and the second conference use the same one or more control channels for audio group identification, then the participant computing devices (210, 211, and 213) may mistakenly identify themselves as being members of the same audio group, which could cause numerous problems. For example, the participant computing device 213 may mute its speaker, even though there is not actually an alternative speaker in the audio environment 230 that playing remote audio for the second conference call, which would effectively cut a user of the participant computing device 213 off from the second conference call. To avoid these problems and support the use of audio group identification for multiple independent conference calls in a common audio environment, the first conference call and the second conference call may be dynamically assigned different, mutually non-interfering control channels to use for audio group identification. For example, the control channels for a conference call may be selected (e.g., randomly selected or selected by a centralized control channel allocation service) from a set of available control channels. For example, the set of available control channels may include mutually orthogonal spread spectrum sequences or codes, or the control channels of the set may use substantially non-overlapping frequency ranges (e.g., ultrasonic frequency ranges).

Information describing one or more dynamically assigned control channels (e.g., including a control channel identifier) for a conference call may be distributed to participants of the conference call. In some implementations, control channel information for use in local audio environments is transferred to participants via an internal control channel in audio streams received via the conference call infrastructure. For example the internal control channel may be encoded in the audio stream using an audio encoding scheme, such spread spectrum (e.g., Zadoff-Chu), tones/frequency shift keying, or amplitude shift keying. For example, where the participant computing device 210 was the first to join the first conference call, it may use an internal control channel to send dynamic external control channel information to the other participants in the first conference call. The external control channel information, including a control channel identifier, may be encoded in a control signal on an internal control channel in the input audio stream 240. This internal control channel signal then propagates to the output audio stream 246 and the output audio stream 250, and is received by the participant computing device 211 and the participant computing device 212. The participant computing device 211 may then filter out the internal control channel signal from the output audio stream 246 before playing a clean version of the output audio stream 246 using its speaker, thus mitigating or avoid audio distortion caused by the internal control channel. In this example, the conference bridge server 220 may be a legacy bridge server that is not upgraded to support any special internal messaging protocol, since the message is conveyed by the via the standard audio paths in the first conference call. In some implementations, out-of-band signaling (e.g., using TCP connections) may be used to transfer dynamically determined external control channel information between conference call participants. For example, the conference bridge server 220 may help to coordinate establishment of out-of-band control signaling channels between conference participants. In some implementations, a third-party server (not shown in FIG. 2) may be configured to provide the service of dynamically assigning external control channels to conference calls and/or establishing communications between conference participants of conference call to facilitate audio group identification.

Similarly, dynamically assigned external control channel information for the second conference call may be distributed to its participants, including the participant computing device 213. For example, the protocols described in relation to FIGS. 9-12B may be used to distribute control channel information within each conference call. Now, with the first conference call and the second conference call using different external control channels in their audio environments, the participant computing device 210 and the participant computing device 211 can use the one or more external control channels for the first conference call to identify that they are members of an audio group within the first conference call, without interference from or interfering with the operation of the participant computing device 213 in the audio environment 230. Thus, independent operation of the first conference call and the second conference call may be supported despite the shared audio environment 230.

Figure 3:
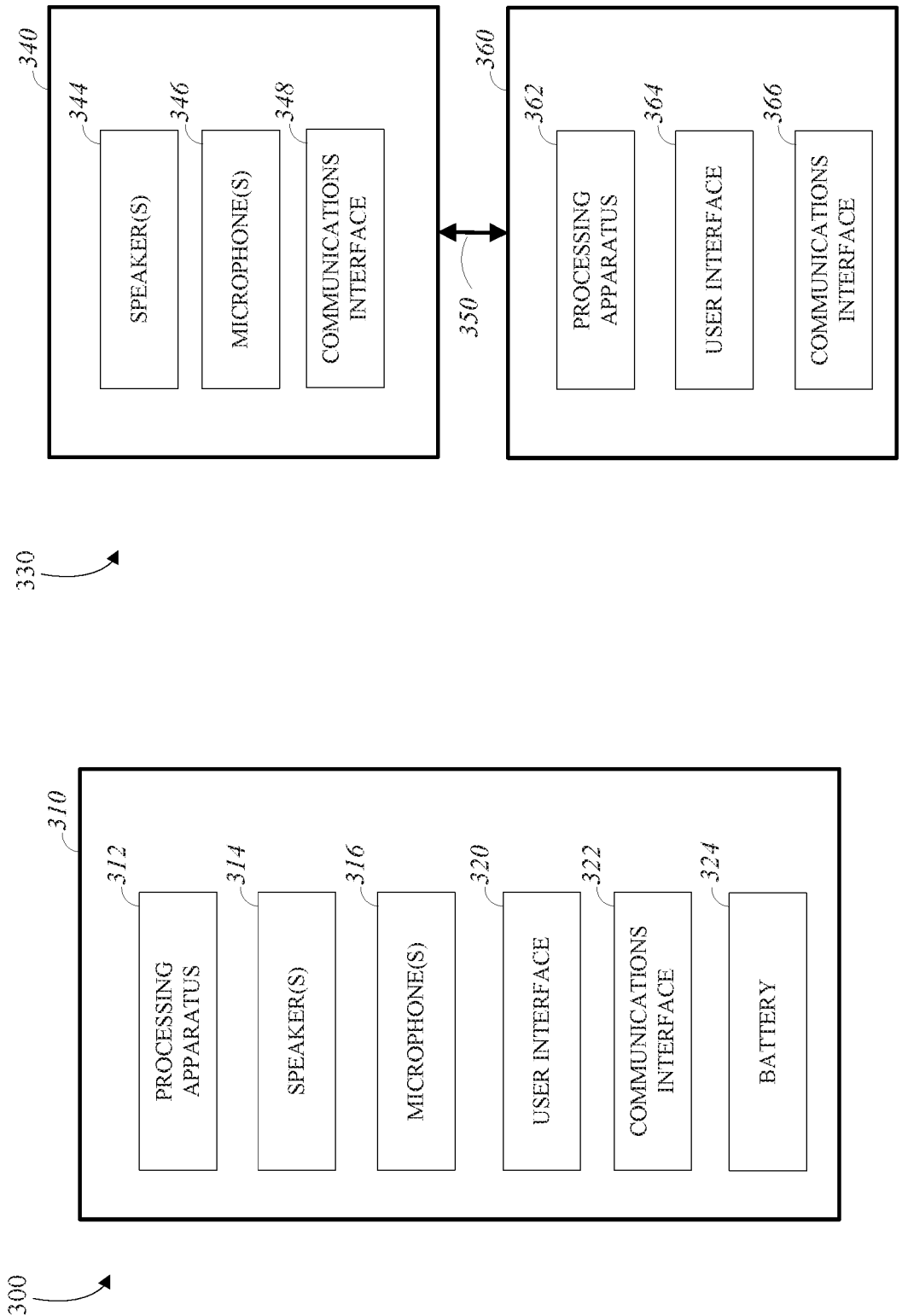
FIG. 3A is a block diagram of an example of a system configured to implement audio group identification for a conference call.
FIG. 3B is a block diagram of an example of a system configured to implement audio group identification for a conference call.

FIG. 3A is a block diagram of an example of a system 300 configured to implement audio group identification for a conference call. The system 300 includes a participant computing device 310 (e.g., a laptop, a tablet, a smartphone, or a smart speaker) that includes a processing apparatus 312 that is configured to play audio signals using one or more speakers 314 and access audio signals captured using one or more microphones 316. The processing apparatus 312 may include software and/or specialized hardware configured to identify audio groups in a conference call based on audio signals captured by the one or more microphones 316. The participant computing device 310 includes a user interface 320, which, may allow a user to control conference call functions. The participant computing device 310 includes a communications interface 322, which may include a network interface, for communicating with other devices. The participant computing device 310 includes a battery 324 for powering the participant computing device 310. For example, the system 300 may be used to implement processes described in this disclosure, such as the process 400 of FIG. 4. For example, the system 300 may be a conference participant computing device (e.g., the participant computing device 110). In some implementations, the system 300 may be a conference participant computing device with an integrated conference bridge. For example, the participant computing device 310 may implement functions of a conference participant and also implement a conference bridge server that communicates with other participant computing devices and performs the functions of a conference bridge.

The processing apparatus 312 may include one or more processors having single or multiple processing cores. The processing apparatus 312 may include memory, such as a random-access memory (RAM) device, flash memory, or any other suitable type of storage device, such as a non-transitory computer readable memory. The memory of the processing apparatus 312 may include executable instructions and data that can be accessed by one or more processors of the processing apparatus 312. For example, the processing apparatus 312 may include one or more DRAM modules, such as double data rate synchronous dynamic random-access memory (DDR SDRAM). In some implementations, the processing apparatus 312 may include a graphical processing unit (GPU). In some implementations, the processing apparatus 312 may include a digital signal processor (DSP). In some implementations, the processing apparatus 312 may include an application specific integrated circuit (ASIC). For example, the processing apparatus 312 may include a custom audio signal processor. In some implementations, the processing apparatus 312 may have multiple processing units in different portions of the participant computing device 310.

The processing apparatus 312 may be configured to: join a conference call using a network interface of the communications interface 322; access an audio signal that has been captured using the one or more microphones 316; detect a control signal in the audio signal; and, responsive to detection of the control signal, invoke modification of an audio path of the conference call. For example, the control signal may have been played using a speaker of a computing device that has also joined the conference call. The processing apparatus 312 may be configured to invoke the modification of the audio path of the conference call by transmitting a message to a bridge server of the conference call that identifies a group of two or more computing devices that have joined the conference call as sharing an audio environment. The processing apparatus 312 may be configured to invoke the modification of the audio path of the conference call by changing gains of the one or more speakers 314. For example, the processing apparatus 312 may be configured to invoke the modification of the audio path of the conference call by reducing gains of (e.g., muting) the one or more speakers 314. The processing apparatus 312 may be configured to invoke the modification of the audio path of the conference call by changing gains of the one or more microphones 316. For example, the processing apparatus 312 may be configured to invoke the modification of the audio path of the conference call by reducing gains of (e.g., muting) the one or more microphones 316. The control signal may be a first control signal and the processing apparatus 312 may be configured to: play a second control signal using the one or more speakers 314. For example, the second control signal may be on a same control channel as the first control signal. In some implementations, the second control signal is on a different control channel than the first control signal. For example, the first control signal may indicate presence of a primary device of an audio environment associated with the conference call, and the second control signal may indicate the presence of a secondary device of the audio environment associated with the conference call. In some implementations, the secondary device is designated as a successor to the primary device, and the processing apparatus is configured to: detect a prolonged absence of the first control signal; and, responsive to detection of the prolonged absence, stop playing the second control signal and start playing a control signal on the same control channel as the first control signal. In some implementations, the second control signal indicates presence of a primary device of an audio environment associated with the conference call, and the first control signal indicates the presence of a secondary device of the audio environment associated with the conference call. The processing apparatus 312 may be configured to: before detecting the control signal, access a second audio signal received via the network interface from a bridge server of the conference call; before detecting the control signal, detect a control channel identifier in the second audio signal; and, based on the control channel identifier, detect the control signal in a control channel of the first audio signal that is identified by the control channel identifier. The processing apparatus 312 may be configured to: apply a filter to remove a signal encoding the control channel identifier from the second audio signal to obtain a clean audio signal; and play an audio signal based on the clean audio signal using the one or more speakers 314. The processing apparatus 312 may be configured to: receive, using the network interface, a control channel identifier; and based on the control channel identifier, detect the control signal in a control channel of the audio signal that is identified by the control channel identifier. The processing apparatus 312 may be configured to: determine a cross correlation between an audio signal captured using the one or more microphones 316 and an audio signal received via the network interface from a bridge server of the conference call; based on the cross correlation, detect an audio feedback loop in the conference call; and, responsive to detection of the audio feedback loop, reduce a volume parameter of the one or more speakers 314.

The one or more speakers 314 are configured to play audio signals by converting audio signals in an electronic format (e.g., a pulse code modulated (PCM) format) into sounds waves that can propagate in a local audio environment. For example, the one or more speakers 314 may be used to play speech or music that is passed to system 300 by a conference call bridge server (e.g., the conference call bridge server 120). For example, the one or more speakers 314 may be used to play control signals in a local audio environment (e.g., the audio environment 130).

The one or more microphones 316 are configured to capture audio data. The audio data may encode various sounds propagating in a local audio environment, such as speech or music. The one or more microphones 316 may convert sound waves incident on the one or more microphones 316 into one or more audio signals. For example, the one or more microphones 316 may be used to capture an audio signal that includes a control signal on a control channel. The one or more microphones 316 may detect sound and convey information constituting an audio signal as electrical signals (e.g., analog or digital signals). In some implementations, the one or more microphones 316 include an analog-to-digital converter. The one or more microphones 316 may include a microphone configured to capture sound in a vicinity of the participant computing device 310. In some implementations, the one or more microphones 316 include an array of microphones to enable beamforming processing of sound incident on the one or more microphones 316.

The participant computing device 310 may include a user interface 320. For example, the user interface 320 may include an LCD display and one or more speakers for presenting video and/or messages to a user. For example, the user interface 320 may include goggles or a headset with a display configured to support augmented reality applications. For example, the user interface 320 may include a button or switch enabling a person to manually turn the participant computing device 310 on and off. For example, the user interface 320 may include buttons for controlling conference calling functions (e.g., mute, volume adjustments, dial, and/or number entry). For example, the user interface 320 may include a keyboard and track pad.

The participant computing device 310 may include a communications interface 322, which may enable communications with other devices. The communications interface 322 may include a network interface (e.g., an Ethernet interface, ZigBee interface, and/or a Wi-Fi interface) that is configured to communicate via an electronic communications network with other devices such as a conference bridge server and/or other conference participant computing devices. For example, the communications interface 322 may be used to receive audio data from a conference bridge server and/or from other conference participant computing devices. For example, the communications interface 322 may be used to transmit audio data to a conference bridge server and/or to other conference participant computing devices. For example, the communications interface 322 may include a wired interface, such as a high-definition multimedia interface (HDMI), a universal serial bus (USB) interface, or a FireWire interface. For example, the communications interface 322 may include a wireless interface, such as a Bluetooth interface, a ZigBee interface, and/or a Wi-Fi interface.

The participant computing device 310 may include a battery 324 that powers the participant computing device 310 and/or its peripherals. For example, the battery 324 may be charged wirelessly or through a micro-USB interface.

FIG. 3B is a block diagram of an example of a system 300 configured to implement audio group identification for a conference call. The system 330 includes an audio interface device 340 and a computing device 360 that communicate via a communications link 350. The audio interface device 340 includes one or more speakers 344 and one or more microphones 346 that are configured to play and capture audio signals. The audio interface device 340 includes a communications interface 348 configured to transfer audio data via the communication link 350 to and from the computing device 360. The computing device 360 includes a processing apparatus 362 that is configured to receive, using the communications interface 366, audio data from the one or more microphones 346. The processing apparatus 362 is configured to transmit, using the communications interface 366, audio data to the audio interface device 340 for play out using the one or more speakers 344. The processing apparatus 362 may include software and/or specialized hardware configured to identify audio groups in a conference call based on audio signals captured by the one or more microphones 346. For example, the system 330 may be used to implement processes described in this disclosure, such as the process 400 of FIG. 4. For example, the system 330 may be a conference participant computing device (e.g., the participant computing device 110). In some implementations, the system 330 may be a conference participant computing device with an integrated conference bridge. For example, the computing device 360 may implement functions of a conference participant using the audio interface device 340 and also implement a conference bridge server that communicates with other participant computing devices and perform the functions of a conference bridge.

The one or more speakers 344 are configured to play audio signals by converting audio signals in an electronic format (e.g., a pulse code modulated (PCM) format) into sounds waves that can propagate in a local audio environment. For example, the one or more speakers 344 may be used to play speech or music that is passed to system 330 by a conference call bridge server (e.g., the conference call bridge server 120). For example, the one or more speakers 344 may be used to play control signals in a local audio environment (e.g., the audio environment 130).

The one or more microphones 346 are configured to capture the audio data. The audio data may encode various sounds propagating in a local audio environment, such as speech or music. The one or more microphones 346 may convert sound waves incident on the one or more microphones 346 into one or more audio signals. For example, the one or more microphones 346 may be used to capture an audio signal that includes a control signal on a control channel. The one or more microphones 346 may detect sound and convey information constituting an audio signal as electrical signals (e.g., analog or digital signals). In some implementations, the one or more microphones 346 include an analog-to-digital converter. The one or more microphones 346 may include a microphone configured to capture sound in a vicinity of the audio interface device 340. In some implementations, the one or more microphones 346 include an array of microphones to enable beamforming processing of sound incident on the one or more microphones 346.

The communications link 350 may be a wired communications link or a wireless communications link. The communications interface 348 and the communications interface 366 may enable communications over the communications link 350. For example, the communications interface 348 and the communications interface 366 may include a high-definition multimedia interface (HDMI), a universal serial bus (USB) interface, a FireWire interface, a Bluetooth interface, a ZigBee interface, and/or a Wi-Fi interface. For example, the communications interface 348 and the communications interface 366 may be used to transfer audio data encoding audio signals from the audio interface device 340 to the computing device 360 for signal processing (e.g., band-pass filtering) to detect control signals from the one or more microphones 346. The communications interface 366 may include a network interface (e.g., an Ethernet interface, ZigBee interface, and/or a Wi-Fi interface) that is configured to communicate via an electronic communications network with other devices such as a conference bridge server and/or other conference participant computing devices.

The processing apparatus 362 may include one or more processors having single or multiple processing cores. The processing apparatus 362 may include memory, such as a random-access memory (RAM) device, flash memory, or any other suitable type of storage device, such as a non-transitory computer readable memory. The memory of the processing apparatus 362 may include executable instructions and data that can be accessed by one or more processors of the processing apparatus 362. For example, the processing apparatus 362 may include one or more DRAM modules, such as double data rate synchronous dynamic random-access memory (DDR SDRAM). In some implementations, the processing apparatus 362 may include a graphical processing unit (GPU). In some implementations, the processing apparatus 362 may include a digital signal processor (DSP). In some implementations, the processing apparatus 362 may include an application specific integrated circuit (ASIC). For example, the processing apparatus 362 may include a custom image signal processor.

The processing apparatus 362 may be configured to: join a conference call using a network interface of the communications interface 366; access an audio signal that has been captured using the one or more microphones; detect a control signal in the audio signal; and, responsive to detection of the control signal, invoke modification of an audio path of the conference call. For example, the control signal may have been played using a speaker of a computing device that has also joined the conference call. The processing apparatus 362 may be configured to invoke the modification of the audio path of the conference call by transmitting a message to a bridge server of the conference call that identifies a group of two or more computing devices that have joined the conference call as sharing an audio environment. The processing apparatus 362 may be configured to invoke the modification of the audio path of the conference call by muting the speaker. The processing apparatus 362 may be configured to invoke the modification of the audio path of the conference call by muting the microphone. The control signal may be a first control signal and the processing apparatus 362 may be configured to: play a second control signal using the one or more speakers 344. For example, the second control signal may be on a same control channel as the first control signal. In some implementations, the second control signal is on a different control channel than the first control signal. For example, the first control signal may indicate presence of a primary device of an audio environment associated with the conference call, and the second control signal may indicate the presence of a secondary device of the audio environment associated with the conference call. In some implementations, the secondary device is designated as a successor to the primary device, and the processing apparatus is configured to: detect a prolonged absence of the first control signal; and, responsive to detection of the prolonged absence, stop playing the second control signal and start playing a control signal on the same control channel as the first control signal. In some implementations, the second control signal indicates presence of a primary device of an audio environment associated with the conference call, and the first control signal indicates the presence of a secondary device of the audio environment associated with the conference call. The processing apparatus 362 may be configured to: before detecting the control signal, access a second audio signal received via the network interface from a bridge server of the conference call; before detecting the control signal, detect a control channel identifier in the second audio signal; and, based on the control channel identifier, detect the control signal in a control channel of the first audio signal that is identified by the control channel identifier. The processing apparatus 362 may be configured to: apply a filter to remove a signal encoding the control channel identifier from the second audio signal to obtain a clean audio signal; and play an audio signal based on the clean audio signal using the one or more speakers 344. The processing apparatus 362 may be configured to: receive, using the network interface, a control channel identifier; and based on the control channel identifier, detect the control signal in a control channel of the audio signal that is identified by the control channel identifier. The processing apparatus 362 may be configured to: determine a cross correlation between an audio signal captured using the one or more microphones 346 and an audio signal received via the network interface from a bridge server of the conference call; based on the cross correlation, detect an audio feedback loop in the conference call; and, responsive to detection of the audio feedback loop, reduce a volume parameter of the one or more speakers 344.

The computing device 360 may include a user interface 364. For example, the user interface 364 may include a touchscreen display and one or more speakers for presenting video and/or messages to a user and receiving commands from a user. For example, the user interface 364 may include goggles or a headset with a display configured to support augmented reality applications. For example, the user interface 364 may include a button or switch enabling a person to manually turn the computing device 360 on and off. In some implementations, commands (e.g., mute or volume adjustments) received via the user interface 364 may be passed on to the audio interface device 340 via the communications link 350.

Figure 4:
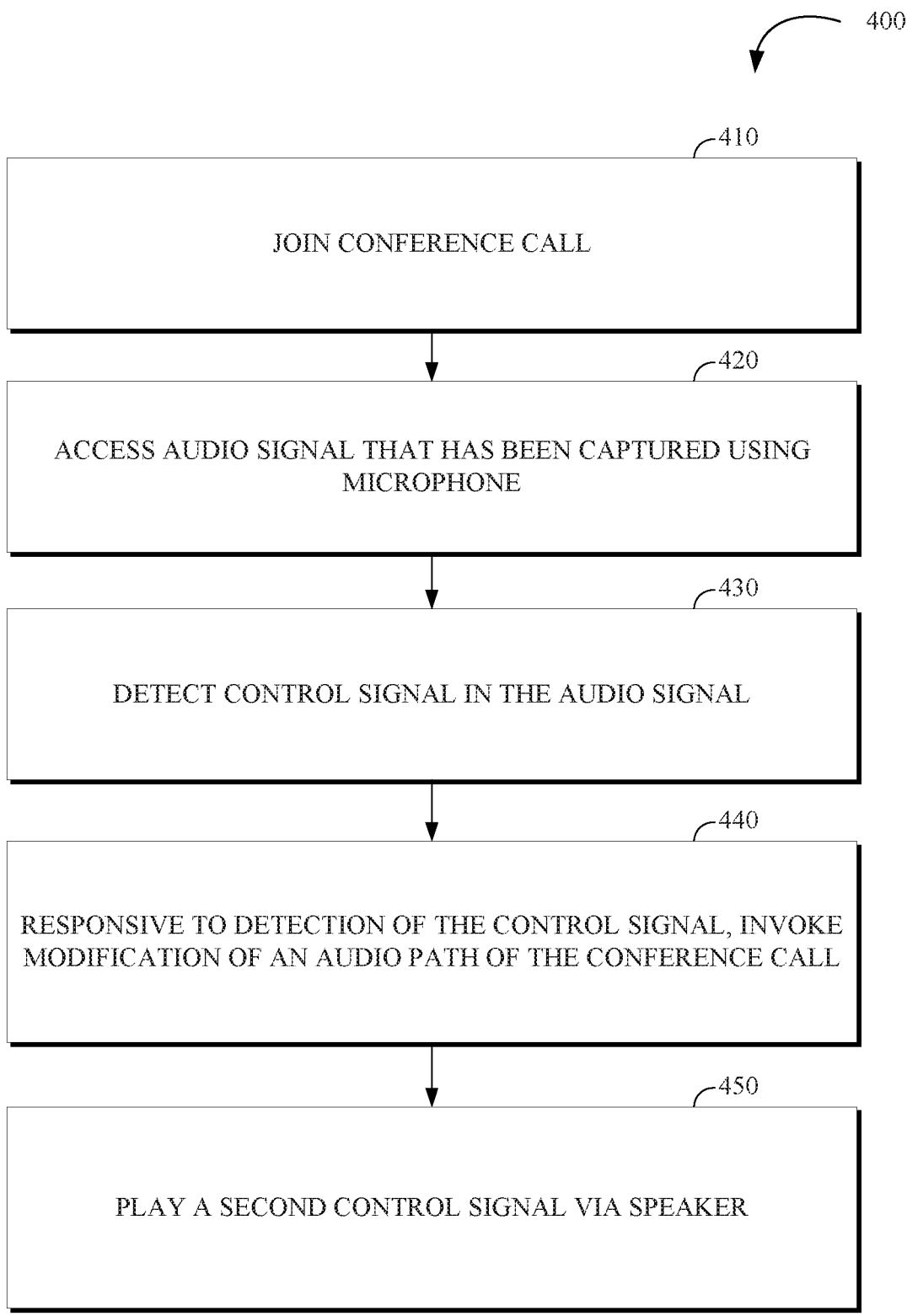
FIG. 4 is a flowchart of an example of a process for audio group identification for a conference call.

FIG. 4 is a flowchart of an example of a process 400 for audio group identification for a conference call. By detecting and/or sending control signals in a local audio environment, the presence of other devices that have joined the conference call from within the same audio environment can be detected. Audio distortions, such as audio multipath and unstable feedback loops, can then be mitigated or eliminated by modifying one or more audio paths of the conference call based on information about a local audio group of conference participants. The process 400 includes joining 410 a conference call using a network interface; accessing 420 an audio signal that has been captured using a microphone; detecting 430 a control signal in the audio signal; responsive to detection of the control signal, invoking 440 modification of an audio path of the conference call; and playing 450 a second control signal using a speaker. For example, the process 400 may be implemented by a participant computing device (e.g., the participant computing device A 110 of FIG. 1). For example, the process 400 may be implemented by the system 300 of FIG. 3A. For example, the process 400 may be implemented by the system 330 of FIG. 3B.

The process 400 includes joining 410 a conference call using a network interface (e.g., the a WiFi interface). For example, joining 410 the conference call may include sending a request to join to a conference bridge server (e.g., the conference bridge server 120) via a network (e.g., an internet protocol network) using the network interface. In some implementations, joining 410 the conference call includes exchanging messages with the conference bridge server to establish audio streams bearing audio signals to and from the conference bridge server. In some implementations, joining 410 the conference call includes establishing audio streams bearing audio signals between multiple devices that have joined the conference call. For example, a participant device (e.g., the first participant device to join the conference call) may also serve as the conference bridge server. In some implementations, joining 410 the conference call may include receiving a conference call identifier and/or parameters of one or more audio control channels for the conference call from the conference bridge server.

The process 400 includes accessing 420 an audio signal that has been captured using a microphone (e.g., the microphone 140). The audio signal may encode sound in a local audio environment, which may be checked for control signals associated with the conference call. The audio signal may be accessed 420 in variety of ways. For example, the audio signal may be accessed 420 by reading directly from a microphone (e.g., the one or more microphones 316) or from a memory via a bus or other interconnect. In some implementations, the audio signal is accessed 420 directly from a microphone without intermediate signal processing. In some implementations, the audio signal is accessed 420 after being subjected to intermediate signal processing (e.g., pass-band filtering or encoding and decoding). In some implementations, the audio signal is accessed 420 by retrieving the audio data from a memory or other data storage apparatus. For example, the audio signal may be accessed 420 by receiving audio data via a communications link (e.g., the communications link 350). For example, the audio signal may be accessed 420 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the audio signal may be accessed 420 via the communications interface 366. For example, the audio signal may be accessed 420 as an input audio signal, which may represent sound waves in a digital format, such as in a pulse-code modulated format. For example, accessing 420 the audio signal may include decoding an encoded audio track (e.g., encoded in compliance with a standard, such as MP3 or AAC) to recover a pulse-code modulated audio signal.

The process 400 includes detecting 430 a control signal in the audio signal. The control signal may have been played using a speaker (e.g., the speaker 152) of a computing device (e.g., the participant computing device 112) that has also joined the conference call. The control signal may be in a designated channel within the audio signal. For example, the control signal may be a narrowband audio signal occupying a subset of the available bandwidth of the audio signal from the microphone. In some implementations, a control channel bearing the control signal may be in an ultrasonic frequency range (e.g., between 20 kHz and the Nyquist frequency of the microphone). In some implementations, the control signal is a frequency hop spread spectrum signal (e.g., a CAZAC (constant amplitude zero autocorrelation waveform) sequence, such as a Zadoff-Chu sequence) with a frequency sequence and phase that are associated with the conference call and define the control channel for the conference call. For example, a frequency hop sequence may modulate data (e.g., a conference call participant identifier) born by the control signal or it may be sequence of pure tones. In some implementations, information about the control channel to be used to identify audio groups within the conference call may be received via a network interface from a conference bridge server or another computing device associated with the conference call (e.g., a first participant computing device to join or another third-party server facilitating the audio group identification). For example, a different control channel within audio signals that pass through the conference bridge may be used to convey information about the control channel to be used in the local audio environment(s) of participants in the conference call. For example, the process 700 of FIG. 7 may be implemented to acquire information about the control channel, including a control channel identifier for the conference call, and detect 430 the control signal. For example, out-of-band signaling from other devices associated with the conference call may be used to convey information about the control channel to be used in the local audio environment(s) of participants in the conference call. For example, process 600 of FIG. 6 may be implemented to acquire information about the control channel, including a control channel identifier for the conference call, and detect 430 the control signal. In some implementations, the parameters of the control channel for audio group identification is known a priori by a computing device implementing the process 400. For example, detecting 430 the control signal may include applying a band-pass filter to the audio signal or inputting the audio signal to a spread-spectrum receiver. Detecting 430 the control signal may indicate presence of another computing device within the local audio environment that is also associated with the conference call.

The process 400 includes, responsive to detection of the control signal, invoking 440 modification of an audio path of the conference call. In some implementations, invoking 440 the modification of the audio path of the conference call includes transmitting a message to a bridge server of the conference call that identifies a group of two or more computing devices that have joined the conference call as sharing an audio environment (e.g., the audio environment 130). In some implementations, a bridge server (e.g., the conference bridge server 120) is used to, responsive to the message, disable mixing of audio signals received from members of the group into audio signals that the bridge server transmits to members of the group. This modification of the audio path(s) may prevent or mitigate some audio distortions, such as audio multipath and audio feedback loops, on the conference call. In some implementations, invoking 440 the modification of an audio path of the conference call may include muting a speaker (e.g., the speaker 150). In some implementations, invoking 440 invoke the modification of an audio path of the conference call may include muting a microphone (e.g., the microphone 140). In some implementations, invoking 440 invoke the modification of an audio path of the conference call may include using a frequency multiplexing scheme on audio signals exchanged with a conference bridge server (e.g., as described in the U.S. provisional patent application No. 62/932,445).

The process 400 includes playing a second control signal using a speaker (e.g., the speaker 150). The second control signal may serve to announce the presence of a computing device implementing the process 400 to other computing devices in a local audio environment (e.g., the audio environment 130) that have also joined the conference call. In some implementations, the second control signal is on a same control channel as the first control signal that was captured with the microphone. For example, the process 1500 of FIG. 15 may be implemented using a single B channel to identify an audio group in the conference call. For example, the process 1600 of FIG. 16 may be implemented using a single B channel to identify an audio group in the conference call. In some implementations, the second control signal is on a different control channel than the first control signal. For example, the process 1300 of FIG. 13 may be implemented using two control channels (B1 and B2) to identify an audio group in the conference call. For example, the process 1400 of FIG. 14 may be implemented using two control channels (B1 and B2) to identify an audio group in the conference call.

In a scheme with two control channels in the audio environment, different conventions can be used for allocating the two control channels. For example, a primary channel (e.g., B1) may be owned and transmitted on by a first computing device to join the conference call in the audio environment, and a secondary channel (e.g., B2) may be transmitted on by one or more additional computing devices that join the conference call in the audio environment and detect the transmissions of the first computing device on the primary channel. When any computing device detects at least one other computing device of the conference call in its audio environment, it can enable a conference mode and invoke a modification of an audio path of the conference call to mitigate audio distortions caused by the colocation, or audio proximity, of multiple participants in the conference call. In some implementations, multiple participant computing devices may share the secondary control channel (e.g., B2) and they may contend (e.g., with random backoff) for ownership of the primary control channel (e.g., B1) if and when the first computing device leaves the audio environment or the conference call. In some implementations, a single participant computing device may own the secondary control channel (e.g., B2) and be designated as the successor to the owner of the primary control channel (e.g., B1). If and when the first computing device leaves the audio environment or the conference call, the successor may assume ownership of the primary control channel (e.g., B1) and start transmitting on the primary control channel, and any additional participant computing devices in the audio environment may contend (e.g., with random backoff) for ownership of the secondary control channel (e.g., B2) and the accompanying successor designation. For example, a participant computing device may implement the process 500 of FIG. 5. A computing device implementing the process 400 may be transmitting on a primary control channel and receiving on a secondary control channel, or vice versa. In some implementations, the first control signal (e.g., on channel B1) indicates presence of a primary device of an audio environment associated with the conference call, and the second control signal (e.g., on channel B2) indicates the presence of a secondary device of the audio environment associated with the conference call. In some implementations, the second control signal (e.g., on channel B1) indicates presence of a primary device of an audio environment associated with the conference call, and the first control signal (e.g., on channel B2) indicates the presence of a secondary device of the audio environment associated with the conference call.

Although the process 400 is shown as a series of operations for clarity, implementations of the process 400 or any other technique, process, or algorithm described in connection with the implementations disclosed herein can be performed in various orders or concurrently. Additionally, operations in accordance with this disclosure can be performed with other operations not presented and described herein. For example, the process 400 of FIG. 4 may incorporate the process 800 of FIG. 8 running in parallel as an alternate way of detecting audio feedback loops and other sources of distortion in the presence of participant computing devices in the audio environment that are not configured to support the control channel based audio group identification techniques of the process 400. Furthermore, one or more aspects of the systems and techniques described herein can be omitted. For example, operation 450 may be omitted from the process 400.

Figure 5:
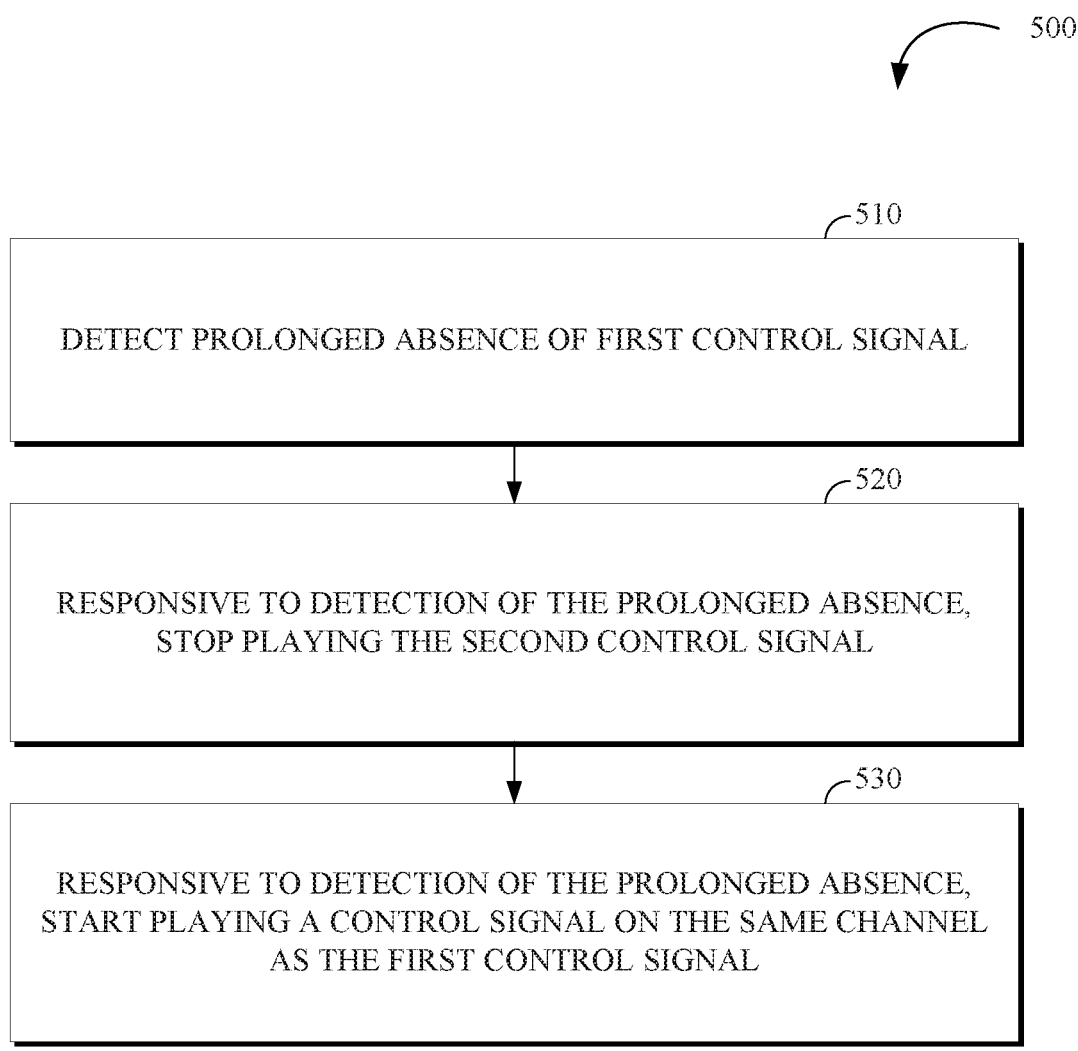
FIG. 5 is a flowchart of an example of a process for claiming a control channel as a successor device when another device in the same audio group leaves the audio group.

FIG. 5 is a flowchart of an example of a process 500 for claiming a control channel as a successor device when another device in the same audio group leaves the audio group. In this example, two control channels are used in an audio environment (e.g., the audio environment 130) for identification of an audio group within a conference call. There is a first control channel (e.g., B1 of FIGS. 13-14) and a second control channel (e.g., B2 of FIGS. 13-14). For example, the first control channel and the second control channel may occupy respective non-overlapping frequency bands, may occupy respective non-overlapping time slots, or may use respective spread-spectrum sequences or codes. A first control signal, on the first control channel, indicates presence of a primary device of an audio environment associated with the conference call, and a second control signal, on the second control channel, indicates the presence of a secondary device of the audio environment associated with the conference call. In this example, the secondary device is designated as a successor to the primary device. The process 500 may be implemented by secondary device. The process 500 includes detecting 510 a prolonged absence of the first control signal; and, responsive to detection of the prolonged absence, stop playing 520 of the second control signal and start playing 530 (e.g., using the speaker 150) a control signal on the same control channel as the first control signal. Thus, the secondary device assumes ownership of the first control channel and becomes the new primary device associated with the conference call in the audio environment. For example, the process 500 may be implemented by a participant computing device (e.g., the participant computing device A 110 of FIG. 1). For example, the process 500 may be implemented by the system 300 of FIG. 3A. For example, the process 500 may be implemented by the system 330 of FIG. 3B.

Figure 6:
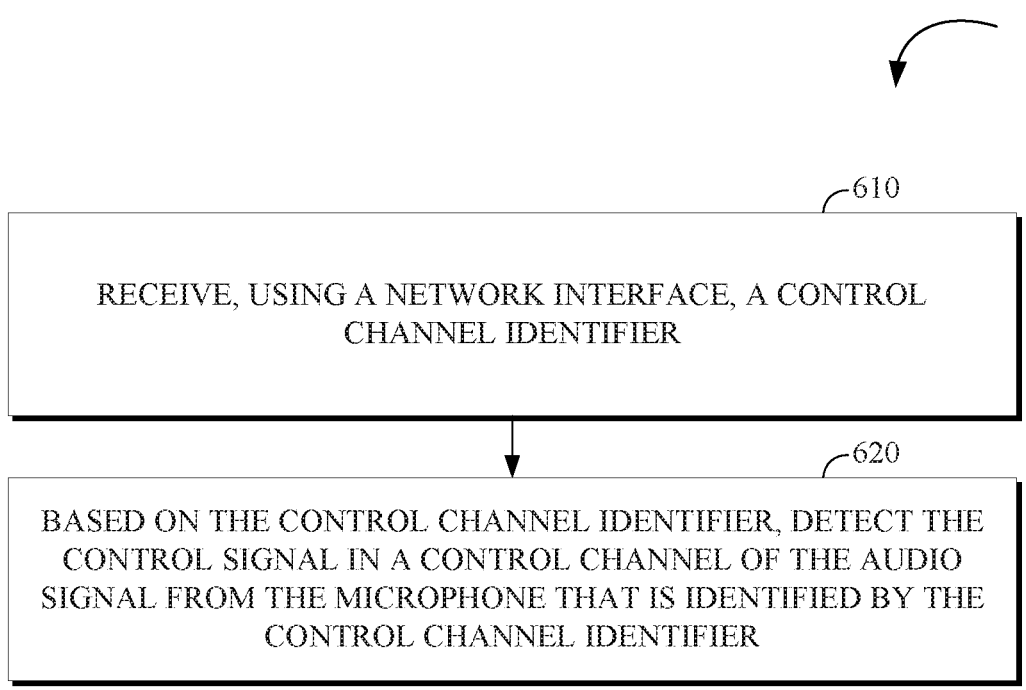
FIG. 6 is a flowchart of an example of a process for detecting a control signal in an audio environment that may be shared by multiple concurrent conference calls.

FIG. 6 is a flowchart of an example of a process 600 for detecting a control signal in an audio environment that may be shared by multiple concurrent conference calls. To support multiple conference calls operating concurrently in a shared audio environment (e.g., the audio environment 230) using the audio group identification techniques of the process 400 of FIG. 4, the process 600 may be used to dynamically allocate one or more (e.g., two) control channels from a set of available control channels in the audio environment to each conference call as the conference call is started up. For example, if the set of control channels is large and the control channels are randomly assigned to conference calls, there may be low probability of control channel collisions between different conference calls. In some implementations, control channels may be assigned to conference calls dynamically in a coordinated fashion by a central server (e.g., as service of a bridge server or as an independent cloud service available for use with many different types of conference bridges) to prevent collisions. The process 600 includes receiving 610, using a network interface (e.g., a WiFi interface), a control channel identifier; and, based on the control channel identifier, detecting 620 the control signal in a control channel of the audio signal that is identified by the control channel identifier. For example, the process 600 may be implemented by a participant computing device (e.g., the participant computing device A 110 of FIG. 1). For example, the process 600 may be implemented by the system 300 of FIG. 3A. For example, the process 600 may be implemented by the system 330 of FIG. 3B.

The process 600 includes receiving 610, using a network interface (e.g., a network interface of the communications interface 322 or of the communications interface 366), a control channel identifier. The control channel identifier may include data that can be used to determine parameters of a control channel, such as upper cutoff frequency and lower cutoff frequency or a spread spectrum sequence or code. For example, the control channel identifier may include an index to a codebook storing parameters for various control channels in a set of audio control channels that is stored by a participant computing device implementing the process 600. In some implementations, control channel identifier may include a beacon signal that specifies a phase of spread spectrum (e.g., a frequency hop) sequence of the control channel. In some implementations, multiple control channel identifiers are received 610 to support the use of multiple control channels (e.g., the B1 and B2 channels of FIGS. 13-14) in audio environments associated with the conference call. For example, the process 900 of FIG. 9 may be implemented to receive 610 the channel identifier that specifies one or more B channels for audio group identification. For example, the process 1100 of FIG. 11 may be implemented to receive 610 the channel identifier that specifies one or more B channels for audio group identification.

The process 600 includes, based on the control channel identifier, detecting 620 the control signal in a control channel of the audio signal that is identified by the control channel identifier. For example, detecting 620 the control signal may include applying a band-pass filter to the audio signal, where the bandpass filter has an upper cutoff frequency and a lower cutoff frequency determined based on the control channel identifier that has been received 610. For example, detecting 620 the control signal may include inputting the audio signal to a spread-spectrum receiver that has been configured to use a particular spread spectrum sequence with a particular phase determined based on the control channel identifier that has been received 610.

Figure 7:
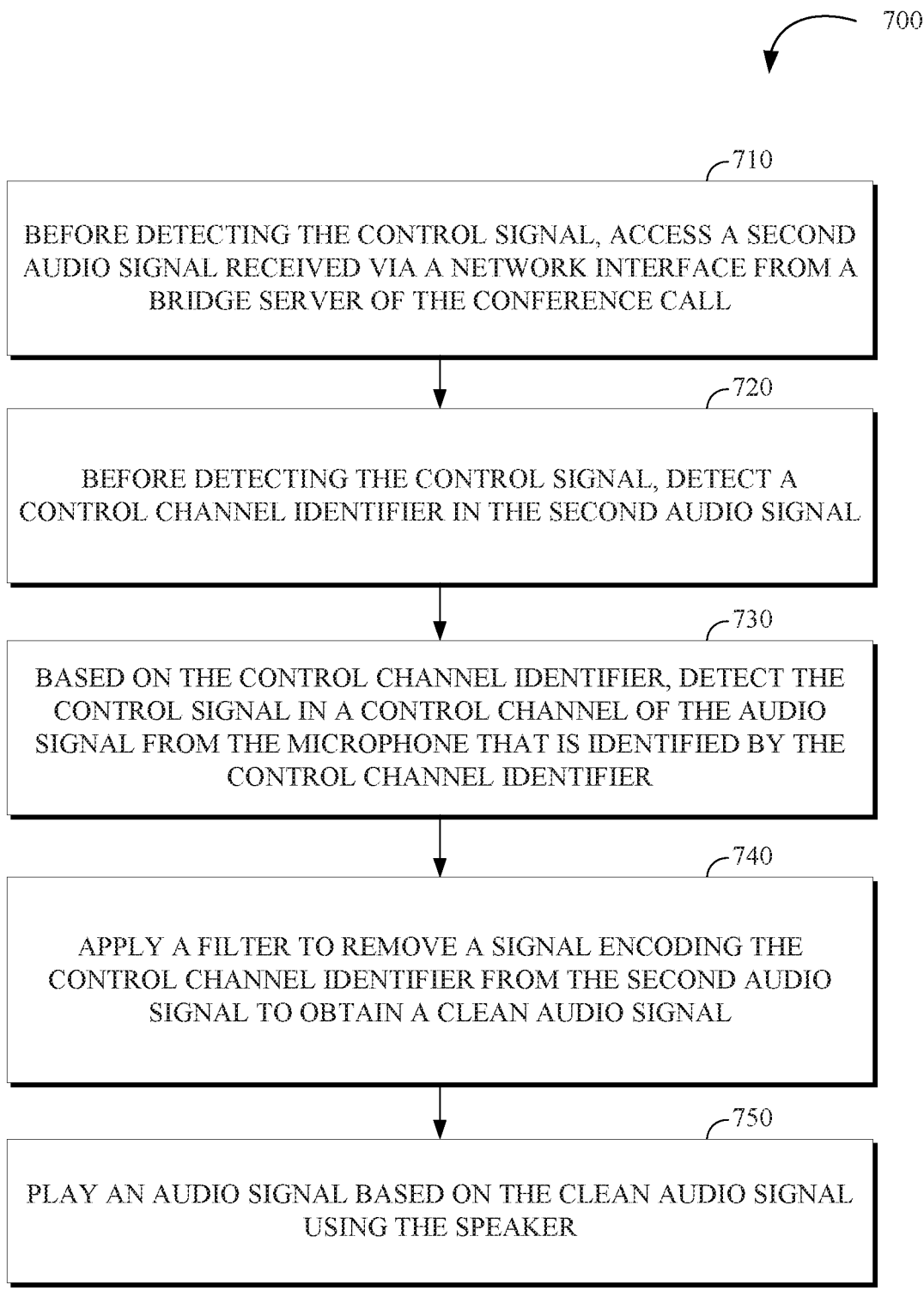
FIG. 7 is a flowchart of an example of a process for detecting a control signal in an audio environment that may be shared by multiple concurrent conference calls.

FIG. 7 is a flowchart of an example of a process 700 for detecting a control signal in an audio environment that may be shared by multiple concurrent conference calls. To support multiple conference calls operating concurrently in a shared audio environment (e.g., the audio environment 230) using the audio group identification techniques of the process 400 of FIG. 4, the process 700 may be used to dynamically allocate one or more (e.g., two) control channels from a set of available control channels in the audio environment to each conference call as the conference call is started up. The process 700 includes, before detecting the control signal, accessing 710 a second audio signal received via the network interface from a bridge server of the conference call; before detecting the control signal, detecting 720 a control channel identifier in the second audio signal; based on the control channel identifier, detecting 730 the control signal in a control channel of the first audio signal that is identified by the control channel identifier; applying 740 a filter to remove a signal encoding the control channel identifier from the second audio signal to obtain a clean audio signal; and playing 750 an audio signal based on the clean audio signal using a speaker. For example, the process 700 may be implemented by a participant computing device (e.g., the participant computing device A 110 of FIG. 1). For example, the process 700 may be implemented by the system 300 of FIG. 3A. For example, the process 700 may be implemented by the system 330 of FIG. 3B.

The process 700 includes, before detecting the control signal, accessing 710 a second audio signal received via the network interface from a bridge server of the conference call. The second audio signal may encode sound from other participants in the conference call, which may be checked for control signals associated with the conference call. The second audio signal may be accessed 710 in variety of ways. For example, the second audio signal may be accessed 710 by reading directly from a network interface or from a memory via a bus or other interconnect. In some implementations, the second audio signal is accessed 710 by retrieving the audio data from a memory or other data storage apparatus. For example, the second audio signal may be accessed 710 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the second audio signal may be accessed 710 as an input audio signal, which may represent sound waves in a digital format, such as in a pulse-code modulated format. For example, accessing 710 the second audio signal may include decoding an encoded audio track (e.g., encoded in compliance with a standard, such as MP3 or AAC) to recover a pulse-code modulated audio signal.

The process 700 includes, before detecting the control signal, detecting 720 a control channel identifier in the second audio signal. The control channel identifier may have been generated by another participant computing device in the conference call (e.g., the owner of the A channel as described in relation to FIGS. 9-12B). The control channel identifier specifies the one or more control channels (e.g., the B channel(s) described in relation to FIGS. 9-17) that will be used by participants of the conference call in their local audio environments to identify an audio groups in the conference call. For example, the control channel identifier may include an index to a table of available control channels for use in local audio environments. For example, the control signal may encode a meeting identifier for the conference call. The control channel identifier may be encoded in a control signal in a designated channel within the second audio signal. For example, the control signal may be a narrowband audio signal occupying a subset of the available bandwidth of the second audio signal from the conference bridge server. In some implementations, a control channel bearing the control signal may be in an ultrasonic frequency range (e.g., 20 kHz to 25 kHz). In some implementations, the control signal is in a lower, audible frequency band to avoid distortion being introduced by audio filters applied by a conference bridge server or other conference call infrastructure for voice quality purposes. For example, detecting 720 the control channel identifier may include applying a band-pass filter to the second audio signal or inputting the second audio signal to a receiver configured to demodulate the control signal.

The process 700 includes, based on the control channel identifier, detecting 730 the control signal in a control channel of the first audio signal that is identified by the control channel identifier. Parameters of one or more control channel (e.g., an upper cutoff frequency and a lower cutoff frequency or a spread spectrum sequence or code) to be used in local audio environments may be determined based on the control channel identifier. The parameters may then be used to detect 730 the control signal in a control channel of the first audio signal captured with a microphone from a local audio environment. For example, detecting 730 the control signal may include applying a band-pass filter to the first audio signal. For example, detecting 730 the control signal may include the first audio signal to a spread spectrum receiver, which has been configured using the parameters.

The process 700 includes applying 740 a filter (e.g., a band-stop filter) to remove a signal encoding the control channel identifier from the second audio signal to obtain a clean audio signal. Once control channel identifier information has been recovered from the second audio signal received from the conference bridge server, the audio signal encoding the control channel identifier may be removed to eliminate or reduce audio distortion (e.g., perceived as noise by a human) arising from this signal before the second audio signal is played out on a local speaker.

The process 700 includes playing an audio signal based on the clean audio signal using a speaker (e.g., the speaker 150). In some implementations, the audio signal based on the clean audio signal is subject to additional signal processing (e.g., filtering to equalize a speaker response function or adding sound effects from another application). In some implementations, the audio signal based on the clean audio signal is simply the clean audio signal itself, without additional processing.

Figure 8:
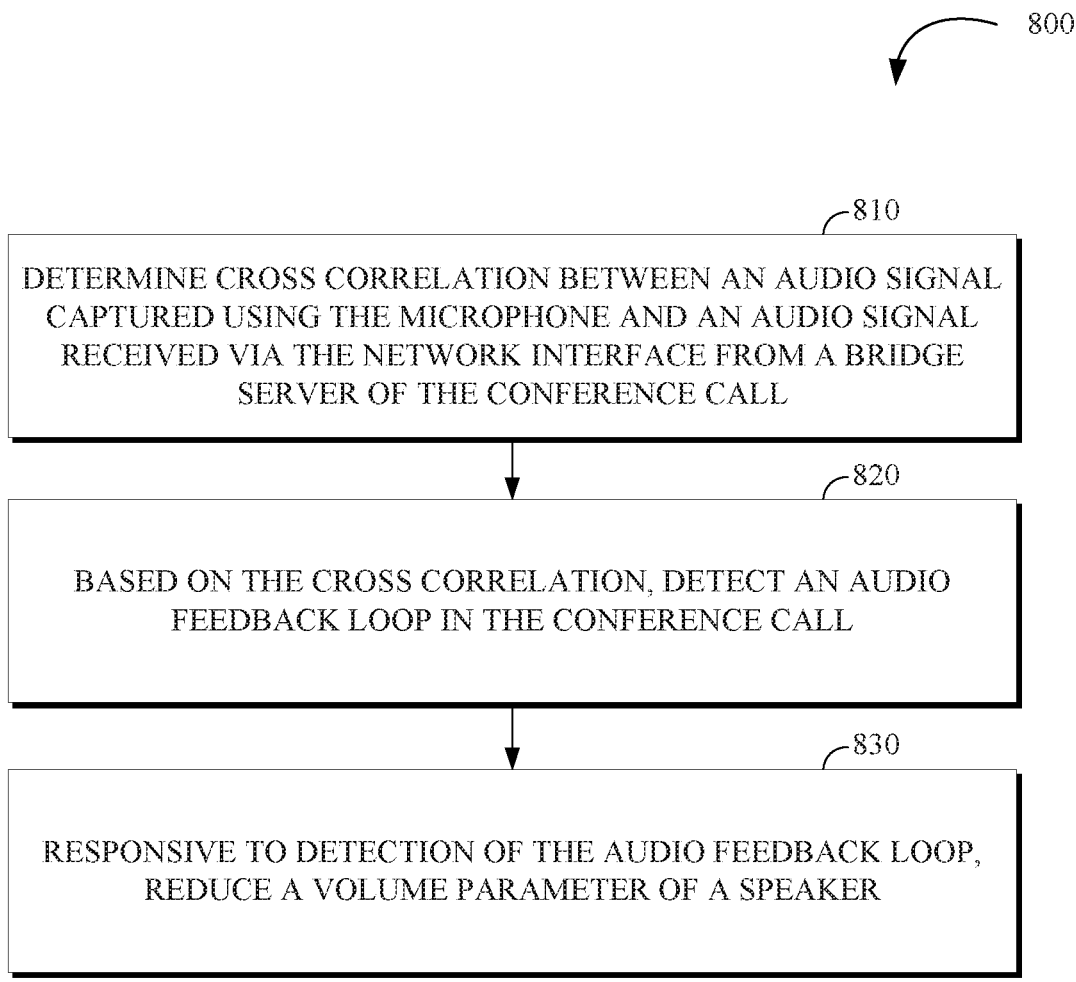
FIG. 8 is a flowchart of an example of a process for detecting and mitigating an audio feedback loop in a conference call.

FIG. 8 is a flowchart of an example of a process 800 for detecting and mitigating an audio feedback loop in a conference call. The techniques for audio group identification may fail in cases where a participant in the conference call has a computing device that does not support the control signaling described above in relation FIG. 4. It may be useful to enable detection of an audio feedback loop even in the presence of uncooperative participants. Some computing devices may be configured to use the process 800 to independently detect and mitigate audio feedback loops. The process 800 includes determining 810 a cross correlation between an audio signal captured using the microphone and an audio signal received via the network interface from a bridge server of the conference call; based on the cross correlation, detecting 820 an audio feedback loop in the conference call; and, responsive to detection of the audio feedback loop, reducing 830 a volume parameter of a speaker. For example, the process 800 may be implemented by a participant computing device (e.g., the participant computing device A 110 of FIG. 1). For example, the process 800 may be implemented by the system 300 of FIG. 3A. For example, the process 800 may be implemented by the system 330 of FIG. 3B.

The process 800 includes determining 810 a cross correlation between an audio signal captured using the microphone (e.g., the microphone 140) and an audio signal received via the network interface from a bridge server (e.g., the conference bridge server 120) of the conference call. For example, when two computing devices that are participating in a conference call are located in the same audio environment (e.g., in the same room), a speech signal may be captured by the microphones of both computing devices and then relayed through the conference bridge server between the two devices. The computing devices may then play the speech signal through their speakers, which can create an audio feedback loop. Thus, the speech signal can appear at both the microphone input and the audio stream input from the conference bridge server for each of the computing devices. For example, one of these computing devices may be configured to independently detect this condition by checking for a cross correlation between the audio it captures using a microphone and the audio it receives from other participants via the conference call bridge.

The process 800 includes, based on the cross correlation, detecting 820 an audio feedback loop in the conference call. For example, the cross correlation at a range of time offsets may be compared to a threshold to detect 820 an audio feedback loop. In some implementations, a threshold must be exceeded in a minimum number of consecutive analysis windows to detect 820 an audio feedback loop.

The process 800 includes, responsive to detection of the audio feedback loop, reducing 830 a volume parameter of a speaker (e.g., the speaker 150). Reducing the volume parameter of the speaker for playout may serve to mitigate the audio feedback loop and reduce echo experienced by the conference call participants. In some cases, reducing the volume parameter of the speaker for playout may prevent a howling condition, which may occur if the audio gain is too high on an audio path including a speaker (e.g., the speaker 150) of one participant computing device and the microphone (e.g., the microphone 142) of another participant computing device.

Examples of Audio Group Identification Protocols

A motivating goal may be to detect if there are two or more conference participants in the same audio environment (e.g., a conference room). In some implementations, all participants in the same room may be sorted into two subgroups: subgroup1 and subgroup2. In stable states of the protocol (i.e., excepting state transitions resulting from participants entering or leaving the conference call or the room), there is one and only one participant in group1. Every other participant in the room is placed in group2. Thus, if subgroup2 is occupied, there are two or more participants in the same room and the members of group1 and group2 are collectively identified as an audio group of the conference call. For example, participants in the room may announce their presence to other participants in the same room by playing a control signal (e.g., a spread spectrum sequence (rs)) on a control channel, called a B channel, in inaudible range (e.g., 20 kHz to 25 kHz) using a speaker. In some implementations, subgroup1 and subgroup2 use a distinct respective control channels (e.g., a B1 channel for subgroup1 and B2 channel for subgroup2) to announce their presence. Thus, the member of subgroup1 knows it is the member of an audio group of the conference call including at least two participants if it detects a transmission on the B2 channel using its microphone. A member of subgroup2 knows it is the member of an audio group of the conference call including at least two participants if it detects a transmission on the B1 channel using its microphone. Some examples of protocols using two control channels (B1 and B2) for audio group identification are described in relation to FIGS. 13-14.

In some implementations, a single control channel may be used to identify an audio group of a conference call. Some examples of protocols using one control channel (B) for audio group identification are described in relation to FIGS. 15-16.

Another performance goal may be to support audio group identification for two (or more) conference calls that both have participants in the same audio environment (e.g., the same room). One way to achieve this goal is to dynamically assign different, mutually non-interfering control channels (e.g., different B channels) to each conference call when the conference call is started up. For example, different B channels may use different uncorrelated random sequences (e.g., spread spectrum sequences, so participants from different conference calls can operate independently in the same audio environment, without causing substantial interference to each other. For example, where the B channels are randomly assigned from a large set of available B channels, there may be a reasonably low probability of collisions between control signals for different conference calls.

For example, the dynamic assignment of one or more B channels to a conference call for use in local audio environments of the participants may be facilitated by the exchange of messages between participants via the conference call. In some implementations, a control channel, which may be called an A channel, in the audio signals passed between participant computing devices via the conference call infrastructure (e.g., including an electronic communications network and/or a conference bridge server) may be used to convey messages including control channel identifier for one or more B channels to be used by participants in the conference call. For example, an A channel may use a subset of the bandwidth of the audio streams passed between participants. In some implementations, A channel signals may use audible portions of the audio signal bandwidth (e.g., between 20 Hz and 20 kHz) without substantially impairing perceived call quality by having the participants filter out A channel signals from the received audio streams, after detecting the A channel control signals and before playing the received audio stream using a local speaker. In this manner an A channel may be used to dynamically assign B channel information to each meeting/conference call. Examples of protocols for using an A channel to distribute B channel information with a conference call are described in relation to FIGS. 9-12B.

FIGS. 9-17 refer to two types of control channels:

"A channel" refers to a control channel that is internal in the sense that appears in audio streams conveyed between participants in a conference call by the infrastructure supporting the conference call, which may include a conference bridge server. The role of the A channel is to distribute (e.g., broadcast) B channel information to participants of the conference call to enable dynamic B channel selection. An A channel may be the same for all conference calls, since it is internal to those conference calls and will not necessarily cause interference between participants of different conference calls that are located in the same audio environment (e.g., the same room). An A channel may use audible or inaudible frequencies within an audio signal without substantially impairing audio quality, since an A channel signal can be filtered out before the audio is played using a speaker. The use of inaudible frequencies for the A channel may provide the advantage of avoiding audio quality impairment for participant computing devices that do not support a protocol for audio group identification (e.g., non-subscribers to an audio group identification service). The use of inaudible frequencies for the A channel may be disadvantageous or unworkable in some conference call systems where, for example, a conference bridge server is configured to filter out or suppress inaudible frequencies when mixing audio for participants. An A channel signal carries data, including a control channel identifier for one or more B channels to be used by the conference call.

"B channel" refers to a control channel that is external in the sense that appears in audio signals that are played as sound waves using speakers in local audio environments of participant computing devices. The role of a B channel is to identify audio groups within a conference call, which may include determining which participants are located in the same audio environments (e.g., in the same room). For example, some protocols use one or more B channels to announce presence of participants in an audio environment, and, by placing participants into two subgroups for an audio environment, detect the condition when at least two participants are located in the same audio environment. Because these signals are played as sound waves that propagate to the ears of human participants, the use of inaudible frequencies (e.g., between 20 kHz and the lowest expected Nyquist frequency of the microphones, or lower than 20 Hz) is generally preferred to preserve audio quality, however, audible frequencies may also be used for a B channel at levels resulting in acceptable amounts of audio quality reduction. In some implementations, a single B channel is used to announce presence in an audio environment. For example, multiple participant computing devices may share a single B channel using time division multiplexing scheme (e.g., with periodic broadcast and listening phases at random phases). For example, the protocols described in relation to FIGS. 15-16 may be used. In some implementations, multiple B channels (e.g., B1 and B2) are used to announce presence in an audio environment. For example, the protocols described in relation to FIGS. 13-14 may be used. The one or more B channels used are the same in all audio environments for a given conference call. The B channels should be different and substantially mutually non-interfering between different conference calls, although B channel selection may be subject to potential low probability random collisions when random selection is employed. For example, a set of available B channels may use substantially non-overlapping frequency ranges. For example, a set of available B channels may use substantially orthogonal spread spectrum sequences or codes (e.g., a CAZAC (constant amplitude zero autocorrelation waveform) sequence, such as a Zadoff-Chu sequence). In some implementations, the control signals on a B channel are binary indicator signals (e.g., present or not), and do not convey additional information. In some implementations, the B channels may be used to transmit additional data, such as a conference participant identifier.

All participants in the same conference may use the A channel to negotiate the choice of one or more B channels as control channels for audio group identification. In some implementations, the A channel can be a dedicated freq. band within an internal speech bearing audio stream. In some implementations, the role of the A channel can be fulfilled by an out-of-band control signals (e.g., sent in transmission control protocol (TCP) packets separate from the audio stream of the conference call) transferred between conference participants and/or a conference bridge server or another centralized server that is configured to manage B channel allocation.

The processes of FIGS. 9-12B may be used to negotiate information of one or more B channels for a conference call using an internal control channel, the A channel.

Figure 9:
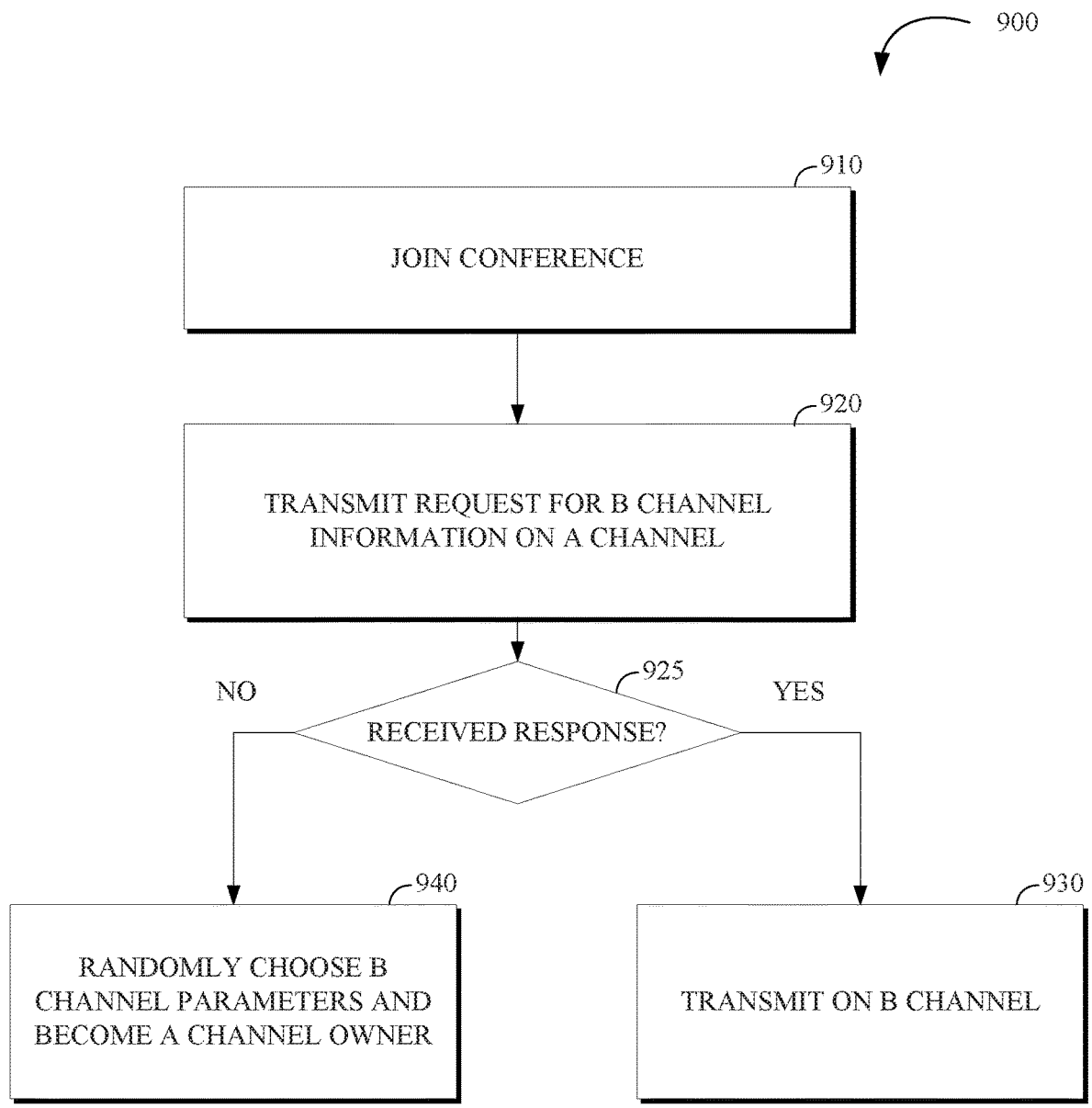
FIG. 9 is a flowchart of an example of a process for determining control channel parameters for audio group identification in a conference call.

FIG. 9 is a flowchart of an example of a process 900 for determining control channel parameters for audio group identification in a conference call. For example, the process 900 may be implemented by a participant computing device when it first joins a conference call. In this example, the protocol used on the A channel to determine and distribute the B channel information for a conference call is request/response protocol, which may reduce amount of A channel signaling required. The process 900 includes joining 910 a conference call; and transmitting 920 a request for B channel information on the A channel. For example, a pre-defined time t1 may set for waiting for response. If no response within t1, conclude "no response", meaning that the participant computing device implementing the process 900 is the first one in this conference call/meeting. If (at step 925) a response to the request is received, then the B channel information (e.g., including a control channel identifier) is learned and may be used to transmit 930 on a B channel of the conference call to announce presence in a local audio environment. In some implementations, an acknowledgement of the response message may be sent on the A channel. If (at step 925) a response to the request is not received, then randomly choose 940 B channel parameters (e.g., by randomly selecting a B channel identifier) (e.g., for B1 and B2) and become the A channel owner. The A channel owner may be configured to respond to requests on the A channel with signals on the A channel encoding the B channel information. The A channel owner may also select or generate a meeting ID for the conference call. In some implementations, the choice of a B channel itself can serve as a meeting ID. For example, the process 900 may be implemented by a participant computing device (e.g., the participant computing device A 110 of FIG. 1). For example, the process 900 may be implemented by the system 300 of FIG. 3A. For example, the process 900 may be implemented by the system 330 of FIG. 3B.

Figure 10A:
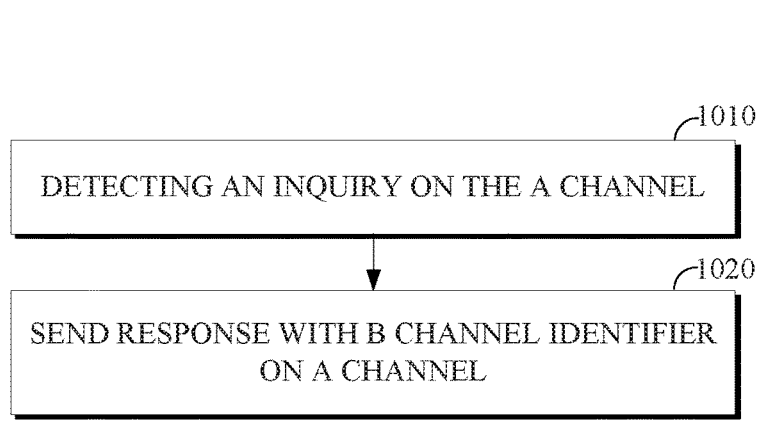
FIG. 10A is a flowchart of an example of a process for responding to a control channel inquiry as an A1 channel owner.

FIG. 10A is a flowchart of an example of a process 1000 for responding to a control channel inquiry as an A channel owner. The process 1000 includes detecting 1010 (e.g., hearing) an inquiry (e.g., a request for B channel data) on the A channel; and sending 1020 a response with the B channel identifier (e.g., for B1 and B2) on the A channel. In some implementations, the response sent 1020 also includes a meeting identifier. For example, the process 1000 may be implemented by a participant computing device (e.g., the participant computing device A 110 of FIG. 1). For example, the process 1000 may be implemented by the system 300 of FIG. 3A. For example, the process 1000 may be implemented by the system 330 of FIG. 3B.

Figure 10B:
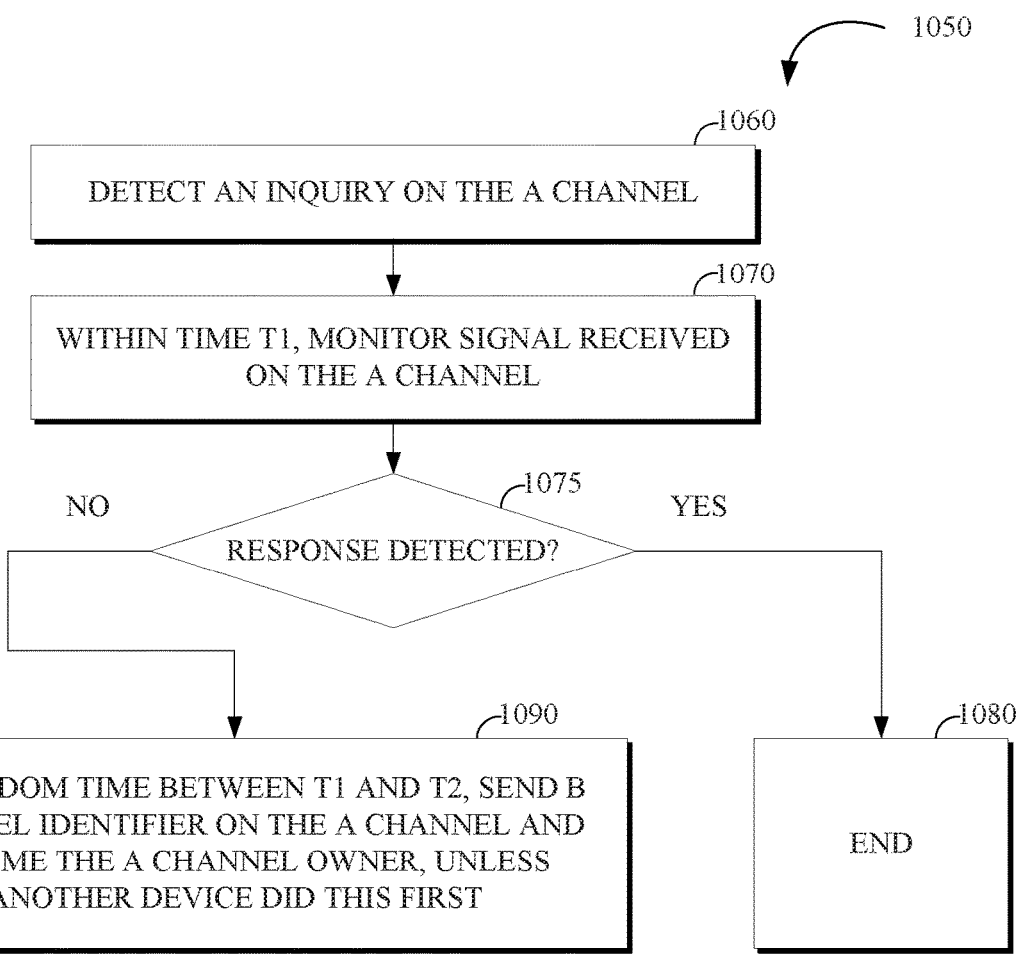
FIG. 10B is a flowchart of an example of a process for responding to a control channel inquiry as an A1 channel non-owner.

FIG. 10B is a flowchart of an example of a process 1050 for responding to a control channel inquiry as an A1 channel non-owner. The process 1050 includes detecting 1060 (e.g., hearing) an inquiry (e.g., a request for B channel data) on the A channel; and, within a time T1, monitoring 1070 signal received on the A channel. If (at step 1075) a response is detected, then the current A channel owner is still active and handling so the process 1050 ends 1080. If (at step 1075) a response is not detected, then at a random time between T1 and T2 (where T2>T1), send 1090 a B channel identifier on the A channel and become the A channel owner, unless another device did this first. In some implementations, the response sent 1090 also includes a meeting identifier. Thus, in case the A channel owner leaves the conference call early, someone else in the conference call/meeting will step in at sometime between t1 and t2, send B channel information (e.g., for B1 and B2), and becomes the A channel owner. For example, the process 1050 may be implemented by a participant computing device (e.g., the participant computing device A 110 of FIG. 1). For example, the process 1050 may be implemented by the system 300 of FIG. 3A. For example, the process 1050 may be implemented by the system 330 of FIG. 3B.

Figure 11:
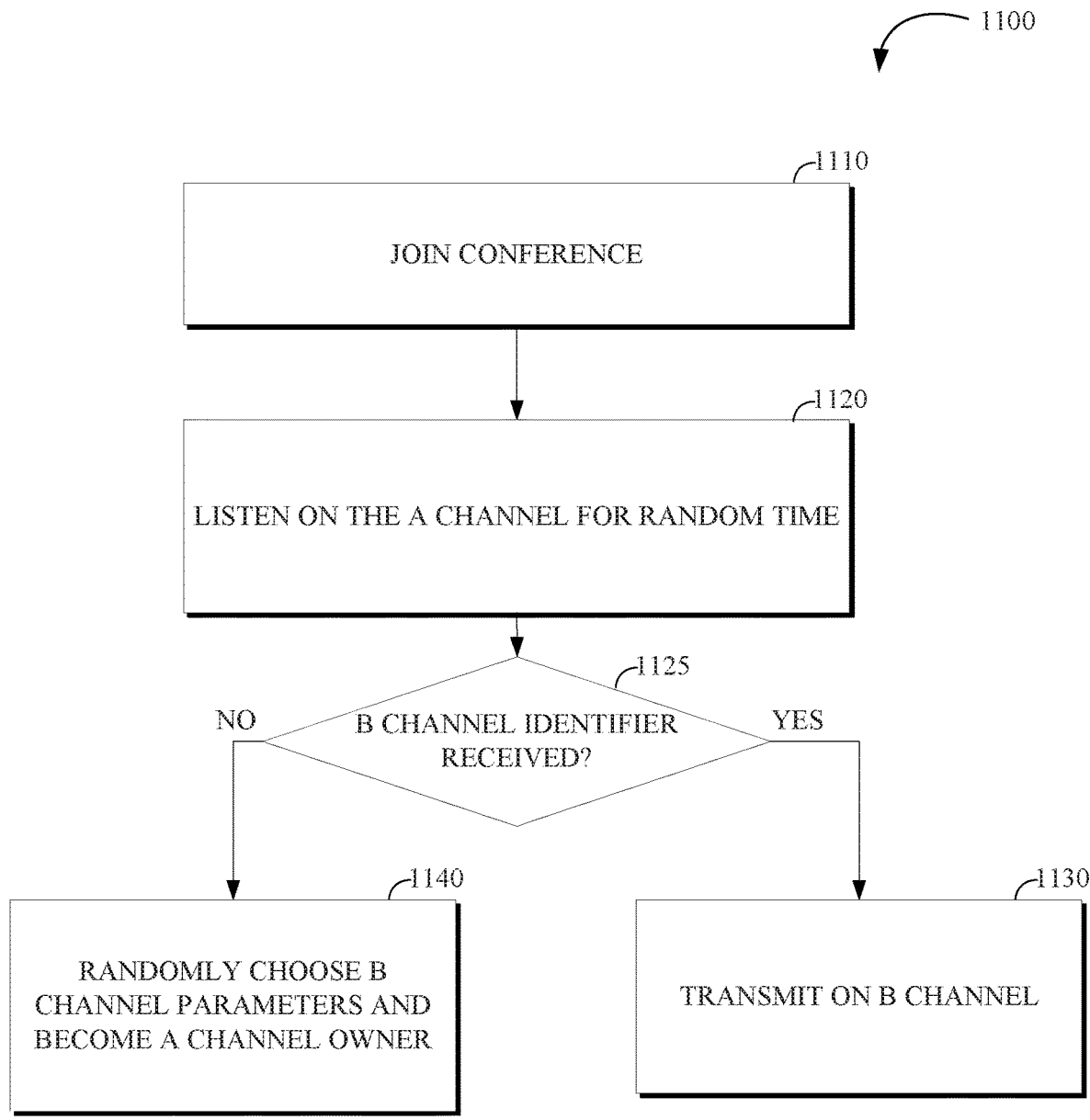
FIG. 11 is a flowchart of an example of a process for determining control channel parameters for audio group identification in a conference call.

FIG. 11 is a flowchart of an example of a process 1100 for determining control channel parameters for audio group identification in a conference call. For example, the process 1100 may be implemented by a participant computing device when it first joins a conference call. In this example, the protocol used on the A channel to determine and distribute the B channel information for a conference call is broadcast protocol. The process 1100 includes joining 1110 a conference call; and listening 1120 on the A channel for random amount of time. In some implementations, the A channel owner is configured to broadcast the B channel identifier constantly on the A channel. In some implementations, the A channel owner is configured to broadcast the B channel identifier periodically on the A channel with silences of duration D. For example, the random time T for listening 1120 may be constrained to be greater the broadcast silence duration D. If (at step 1125) a B channel identifier is received, then the B channel information (e.g., including a control channel identifier) is learned and may be used to transmit 1130 on a B channel of the conference call to announce presence in a local audio environment. In some implementations, a meeting identifier for the conference call may also be received on the A channel. If (at step 1125) a B channel identifier is not received, then randomly choose 1140 B channel parameters (e.g., by randomly selecting a B channel identifier) (e.g., for B1 and B2) and become the A channel owner. The A channel owner may be configured to broadcast signals on the A channel encoding the B channel information including a B channel identifier. The A channel owner may also select or generate a meeting ID for the conference call, which can also be broadcast on the A channel. In some implementations, the choice of a B channel itself can serve as a meeting ID. For example, the process 1100 may be implemented by a participant computing device (e.g., the participant computing device A 110 of FIG. 1). For example, the process 1100 may be implemented by the system 300 of FIG. 3A. For example, the process 1100 may be implemented by the system 330 of FIG. 3B.

Figure 12A:
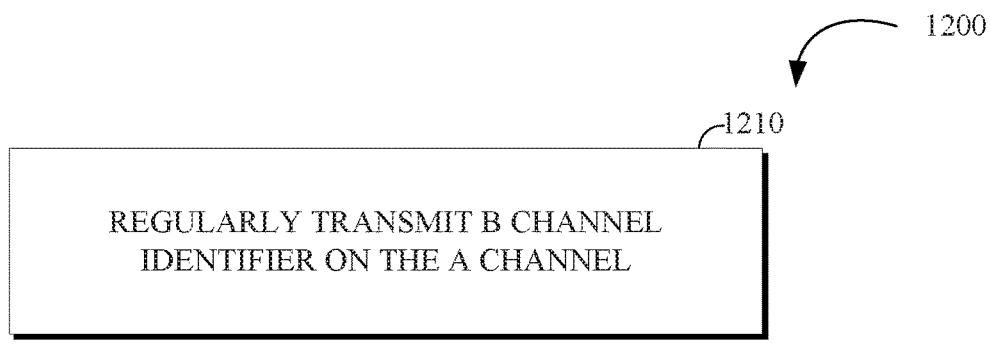
FIG. 12A is a flowchart of an example of a process for sending control channel parameters as an A channel owner.

FIG. 12A is a flowchart of an example of a process 1200 for sending control channel parameters as an A channel owner. The process 1200 includes regularly (e.g., periodically or constantly) transmitting 1210 the B channel identifier (e.g., for B1 and B2) on the A channel. In some implementations, a meeting identifier is also transmitted 1210. For example, the process 1200 may be implemented by a participant computing device (e.g., the participant computing device A 110 of FIG. 1). For example, the process 1200 may be implemented by the system 300 of FIG. 3A. For example, the process 1200 may be implemented by the system 330 of FIG. 3B.

Figure 12B:
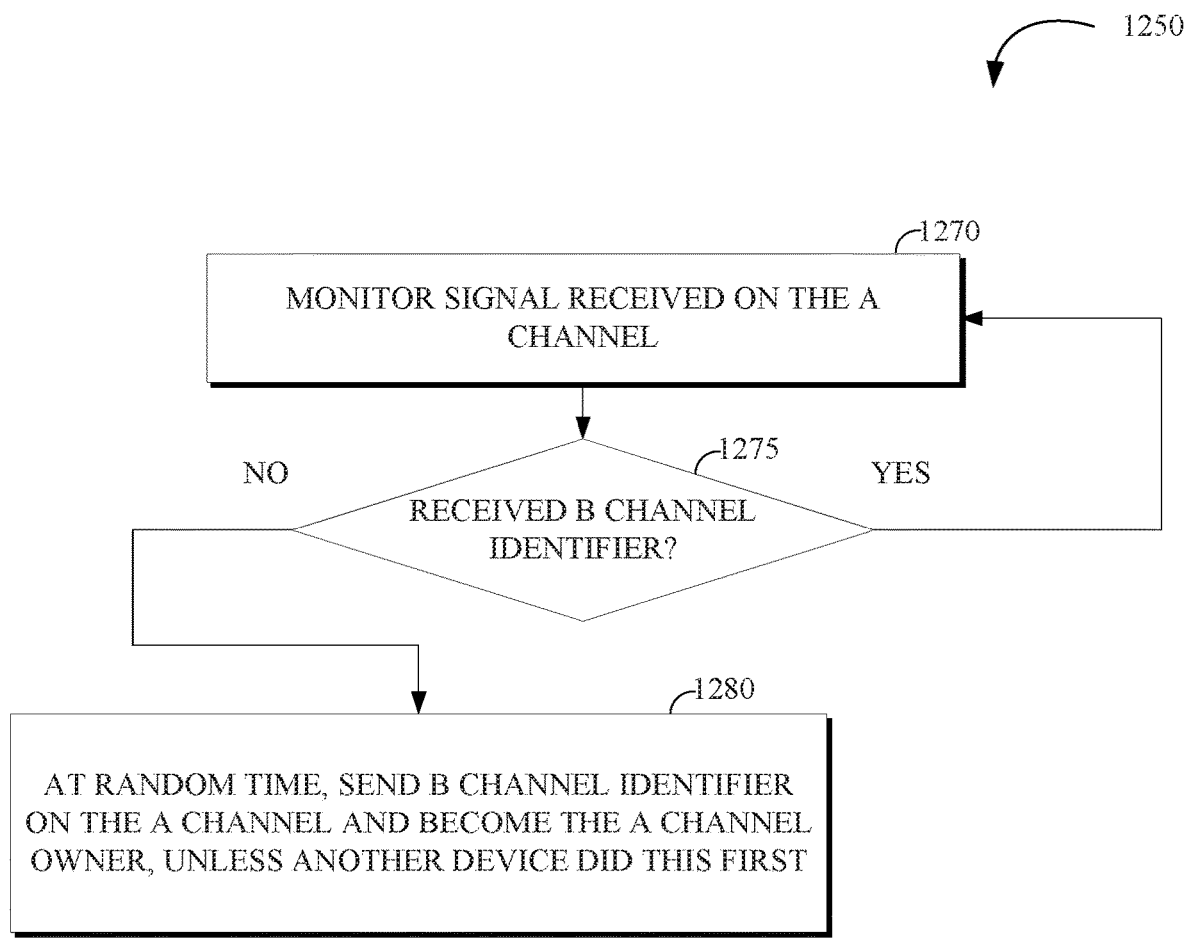
FIG. 12B is a flowchart of an example of a process for sending control channel parameters as an A channel non-owner.

FIG. 12B is a flowchart of an example of a process 1250 for sending control channel parameters as an A channel non-owner. The process 1250 includes monitoring 1270 signal received on the A channel. If (at step 1275) a B channel identifier is received (e.g., heard), then continue to monitor 1270 the A channel. In some implementations, a meeting identifier may be received with the B channel identifier. If (at step 1275) a B channel identifier is not received (e.g., heard), then at a random time T, start to send 1280 a B channel identifier on the A channel and become the A channel owner, unless another device did this first. In some implementations, a meeting identifier is also sent 1280 with the B channel identifier. Thus, in case the A channel owner leaves the conference call early, someone else in the conference call/meeting will step in to send B channel information (e.g., for B1 and B2), and become the A channel owner. For example, the process 1250 may be implemented by a participant computing device (e.g., the participant computing device A 110 of FIG. 1). For example, the process 1250 may be implemented by the system 300 of FIG. 3A. For example, the process 1250 may be implemented by the system 330 of FIG. 3B.

The protocols described in relation to FIGS. 13-16 may be used to discover participants operating in the same audio environment (e.g., in the same room).

Figure 13:
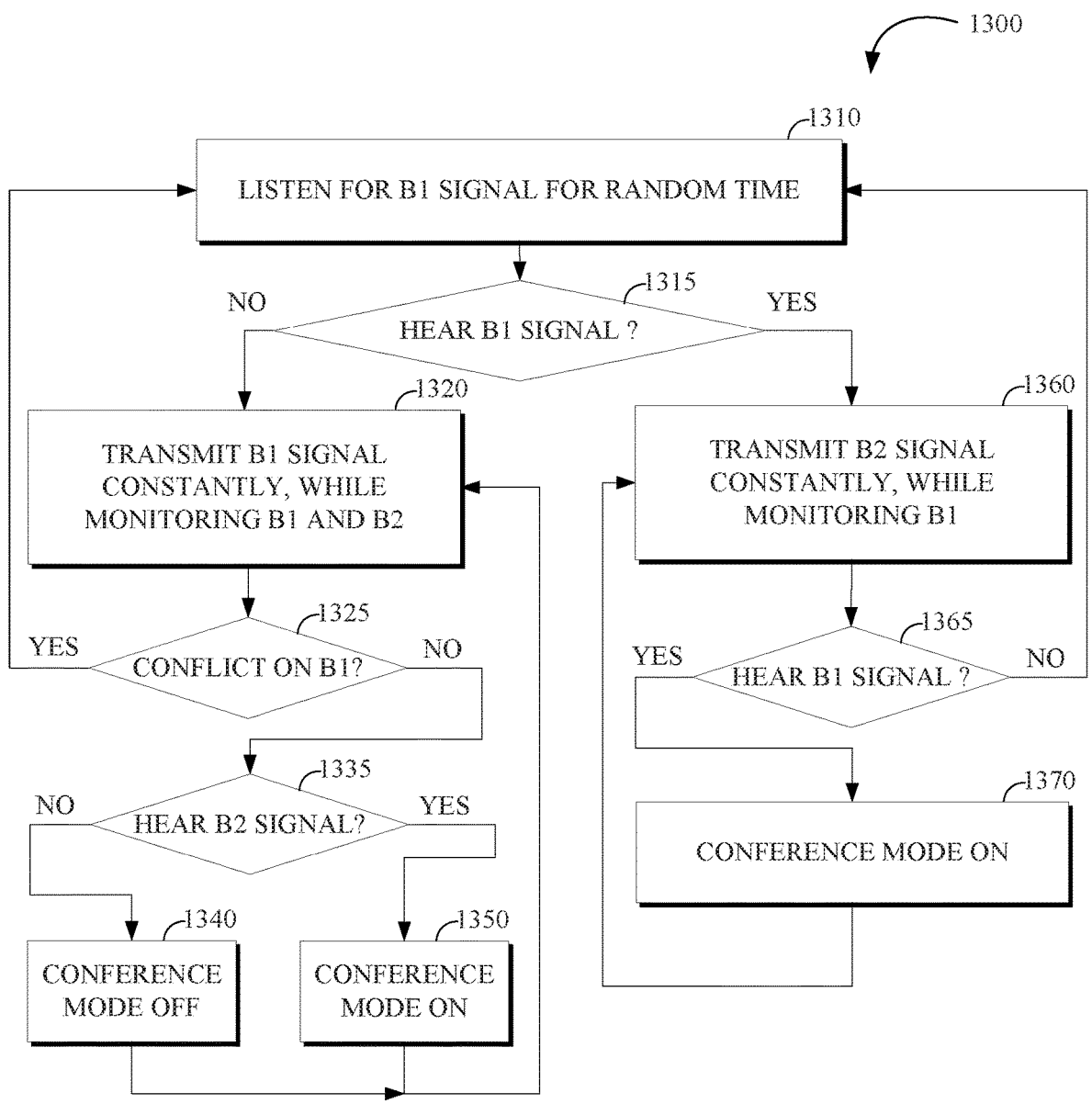
FIG. 13 is a flowchart of an example of a process for using a pair of control channels for audio group identification in a conference call.

FIG. 13 is a flowchart of an example of a process 1300 for using a pair of control channels for audio group identification in a conference call. In this example, the two control channels are called B1 and B2. For example, B1 and B2 may be in a high frequency range (e.g., an inaudible frequency range). In some implementations, B1 and B2 may be two randomly chosen sequences (r1 and r2) from a set of uncorrelated pseudo-random sequences (e.g., spread spectrum sequences). For example, these sequences (r1 and r2) may be transmitted as the B1 signal and the B2 signal respectively. In FIG. 13, "conference mode" refers to a state in which mitigation measures that modify an audio path of the conference call are applied to address an audio group including at least two participants of the conference call that are sharing an audio environment. The process 1300 includes listening 1310 for a B1 signal for a random time T. If (at step 1315) the B1 signal is not heard (i.e., detected using a microphone), then assume ownership of B1 and transmit 1320 a B1 signal constantly, while monitoring B1 and B2. If (at step 1325) there is a conflict on B1 (i.e., another device transmits on B1), then restart the process 1300 by backing off for a random time while listening 1310 for B1 signal. If (at step 1325) there is not a conflict on B1, then, depending on whether (at step 1335) a B2 signal is heard, either confirm 1340 that the conference mode is off, or confirm 1350 that the conference mode is on, and then continue to transmit 1320 on B1 and monitor B1 and B2.

If (at step 1315) the B1 signal is heard (i.e., detected using a microphone), then transmit 1360 the B2 signal constantly, while monitoring B1. If (at step 1365) a B1 signal is heard, then confirm 1370 that the conference mode is on and continue to transmit 1360 the B2 signal constantly, while monitoring B1. If (at step 1365) a B1 signal is not heard, then restart the process 1300 by backing off for a random time while listening 1310 for B1 signal. For example, the process 1300 may be implemented by a participant computing device (e.g., the participant computing device A 110 of FIG. 1). For example, the process 1300 may be implemented by the system 300 of FIG. 3A. For example, the process 1300 may be implemented by the system 330 of FIG. 3B.

Figure 14:
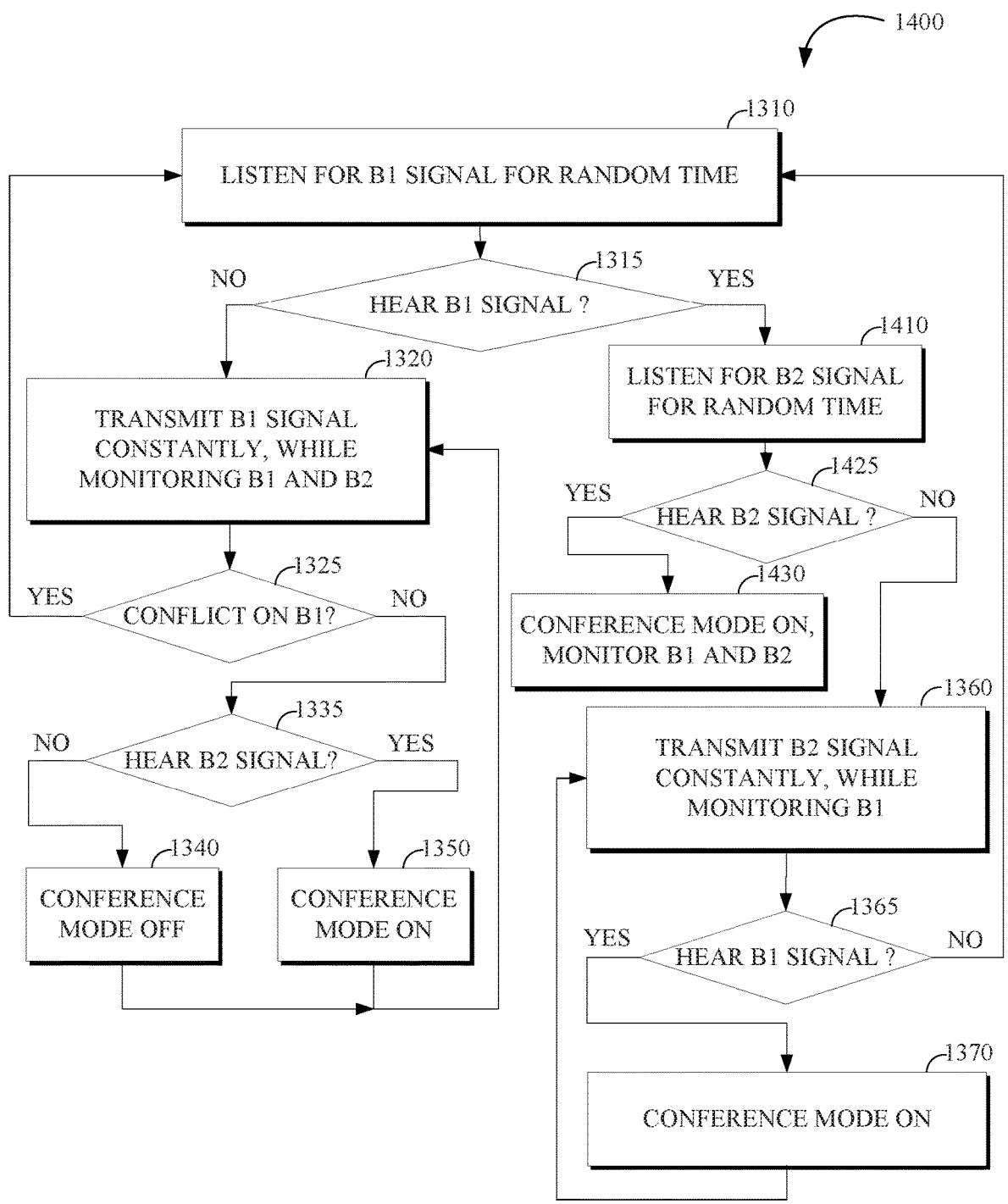
FIG. 14 is a flowchart of an example of a process for using a pair of control channels for audio group identification in a conference call.

FIG. 14 is a flowchart of an example of a process 1400 for using a pair of control channels for audio group identification in a conference call. The process 1400 is similar to process 1300, with the difference that, instead of all participants that do not own B1 transmitting on B2, the protocol is modified to restrict transmission on B2 to a single participant computing device in any stable state. Specifically, if (at step 1315) the B1 signal is heard (i.e., detected using a microphone), then listen 1410 for B2 signal for a random time. If (at step 1425) B2 signal is also heard, then confirm 1430 conference mode is one, and monitor B1 and B2 (without transmitting on B1 or B2). If (at step 1325) the B2 signal is not heard, claim the B2 channel by transmitting 1360 on B2 while monitoring the B1 signal. For example, the process 1400 may be implemented by a participant computing device (e.g., the participant computing device A 110 of FIG. 1). For example, the process 1400 may be implemented by the system 300 of FIG. 3A. For example, the process 1400 may be implemented by the system 330 of FIG. 3B.

Figure 15:
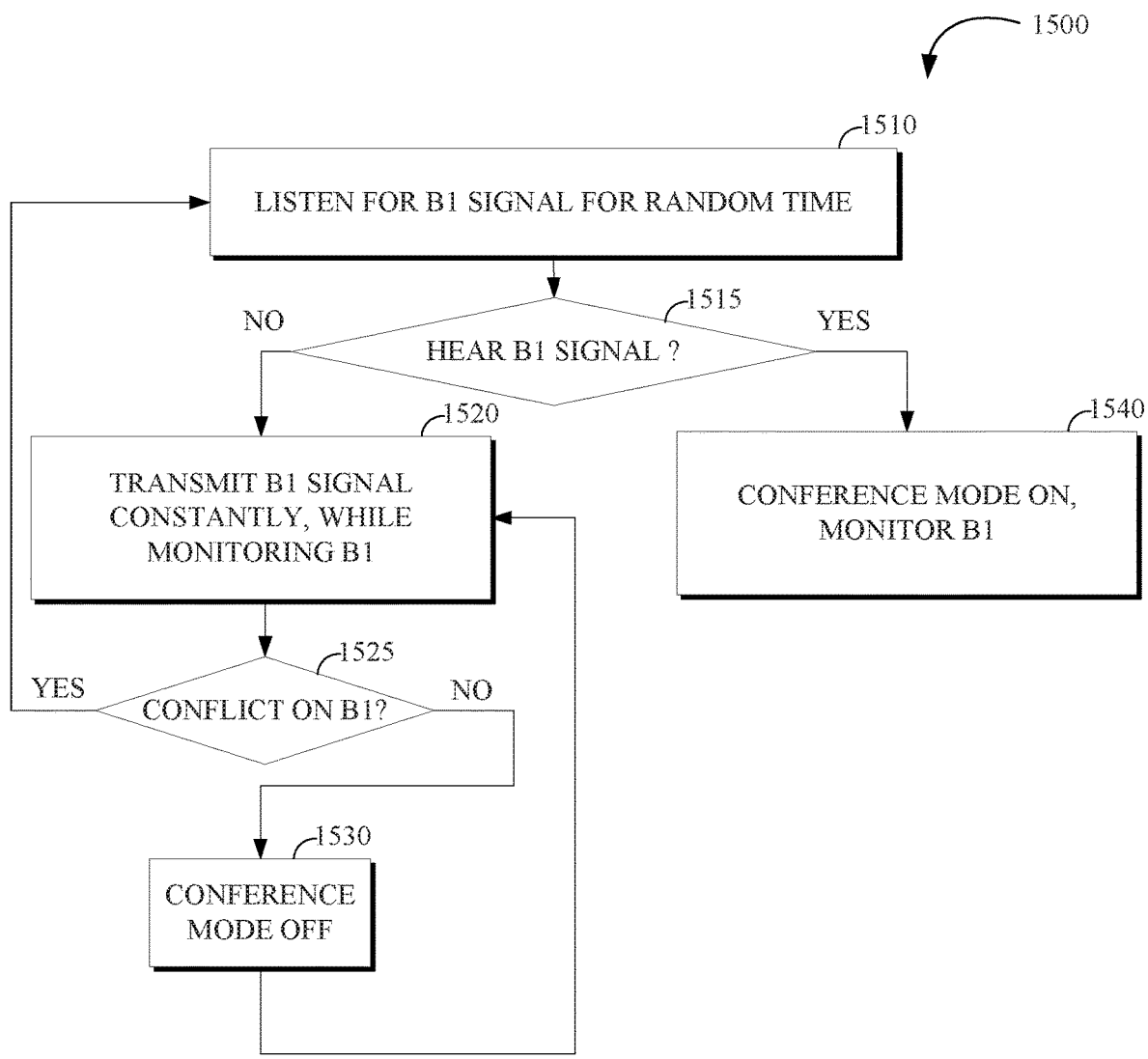
FIG. 15 is a flowchart of an example of a process for using a single control channel for audio group identification in a conference call.

FIG. 15 is a flowchart of an example of a process 1500 for using a single control channel for audio group identification in a conference call. In this example, the control channel is called B1. For example, B1 may be in a high frequency range (e.g., an inaudible frequency range). In some implementations, B1 may be a randomly chosen sequence (r1) from a set of uncorrelated pseudo-random sequences (e.g., spread spectrum sequences). For example, this sequence (r1) may be transmitted as the B1 signal. In FIG. 15, "conference mode" refers to a state in which mitigation measures that modify an audio path of the conference call are applied to address an audio group including at least two participants of the conference call that are sharing an audio environment. The process 1500 includes listening 1510 for a B1 signal for a random time T. If (at step 1515) the B1 signal is not heard (i.e., detected using a microphone), then assume ownership of B1 and transmit 1520 a B1 signal constantly, while monitoring B1. If (at step 1525) there is a conflict on B1 (i.e., another device transmits on B1), then restart the process 1500 by backing off for a random time while listening 1510 for B1 signal. If (at step 1525) there is not a conflict on B1, then confirm 1530 that the conference mode is off, and then continue to transmit 1520 on B1 and monitor B1.

If (at step 1515) the B1 signal is heard, then confirm 1540 that the conference mode is on, and continue to monitor B1. For example, the process 1500 may be implemented by a participant computing device (e.g., the participant computing device A 110 of FIG. 1). For example, the process 1500 may be implemented by the system 300 of FIG. 3A. For example, the process 1500 may be implemented by the system 330 of FIG. 3B.

Figure 16:
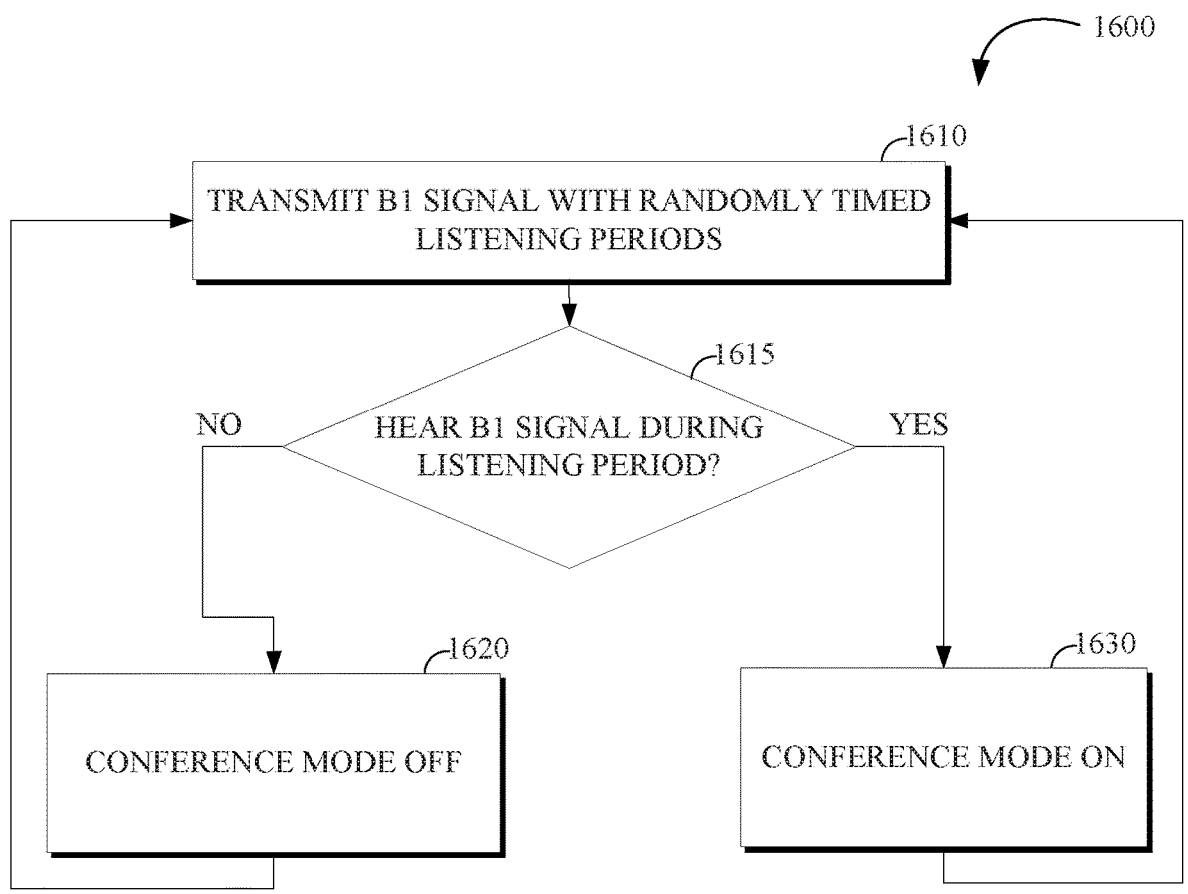
FIG. 16 is a flowchart of an example of a process for using a single control channel for audio group identification in a conference call.

FIG. 16 is a flowchart of an example of a process 1600 for using a single control channel for audio group identification in a conference call. In this example, the protocol calls for all participants to transmit on the single control channel (B1) for the conference call to announce their presence in their local audio environment. The participant computing devices use randomly timed listening periods to detect whether another participant is transmitting on B1 within their audio environment. In this manner a single control channel may be time shared by all participants to identify audio groups. The process 1600 includes transmitting 1610 B1 signal with randomly timed listening periods. During a listening period, the B1 signal transmission is paused to enable the participant computing device implementing the process 1600 to more robustly detect signals on the B1 channel in the audio environment. For example, the listening periods may be periodic with a random phase, or the listening periods may be individually timed at random offsets from a previous listening period. If (at step 1615) a B1 signal is not heard (i.e., detected using a microphone) during a listening period, then confirm 1620 that the conference mode is off, and then continue to transmit 1610 on B1 with randomly timed listening periods. If (at step 1615) a B1 signal is heard during a listening period, then confirm 1630 that the conference mode is on, and then continue to transmit 1610 on B1 with randomly timed listening periods. For example, the process 1600 may be implemented by a participant computing device (e.g., the participant computing device A 110 of FIG. 1). For example, the process 1600 may be implemented by the system 300 of FIG. 3A. For example, the process 1600 may be implemented by the system 330 of FIG. 3B.

In some implementations, randomly located listening periods are used by B1 channel owners in protocols that use B1 and B2 to detect a conflict on B1. For example, a conflict on the an exclusive B1 channel can arise when two audio groups merge during a conference call due to movement of conference participants. For example, a conference participant who is a B1 channel owner in a first audio environment may physically move into a second audio environment that is occupied by another participant acting as a B1 channel owner. For example, in the protocol of FIG. 13, randomly located listening periods during transmission of the B1 signal while monitoring B1, can be used to facilitate checking for conflict on B1 at step 1325. For example, the listening periods may be periodic with a random phase, or the listening periods may be individually timed at random offsets from a previous listening period.

In some implementations, a B1 conflict may be resolved using a backoff and re-compete scheme. When a conflict on B1 is detected, the B1 participant computing device may be configured to backoff from B1 and wait a random period of time Tb. If, during this period of time, no B1 signal is heard, then retransmit B1. If before Tb, the conflict disappears (e.g., the other B1 transmitter stopped earlier), the timer will stop, and the participant will continue to transmit B1.

Figure 17:
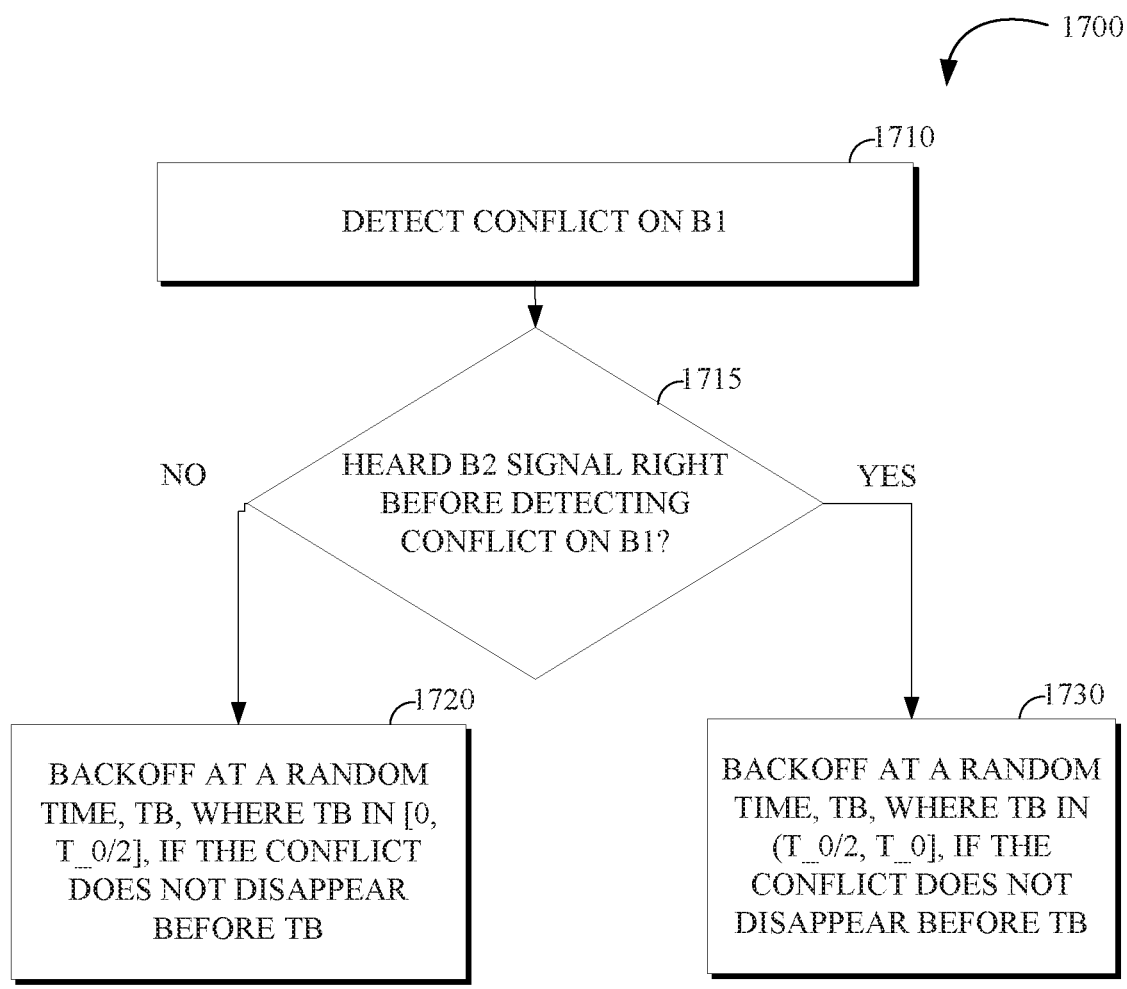
FIG. 17 is a flowchart of an example of a process for resolving a conflict on a primary control channel used for audio group identification in a conference call.

FIG. 17 is a flowchart of an example of a process 1700 for resolving a conflict on a primary control channel (e.g., a B1 channel) used for audio group identification in a conference call. In this example, the protocol calls for backoff with priorities. The process 1700 may be implemented by a participant computing device transmitting on B1. If a conflict appears, a random time Tb to backoff is chosen to contend for the B1 channel and resolve the conflict. The process 1700 includes detecting 1710 a conflict on B1; if (at step 1715) a B2 signal was not heard right before detecting the conflict on B1, then backoff 1720 at a random time Tb in (T_0/2, T_0] if the conflict does not disappear before Tb; and, if (at step 1715) a B2 signal was heard right before detecting the conflict on B1, then backoff 1730 at a random time Tb in (T_0/2, T_0] if the conflict does not disappear before Tb. For example, a single participant (transmitting B1 but not hearing B2) will backoff sooner. For example, the process 1700 may be implemented by a participant computing device (e.g., the participant computing device A 110 of FIG. 1). For example, the process 1700 may be implemented by the system 300 of FIG. 3A. For example, the process 1700 may be implemented by the system 330 of FIG. 3B.

In some implementations of an audio group identification protocol, in each audio environment (e.g., room), a B1 participant can also send meeting ID+room ID, together with the B1 signal. For example, the B1 signal itself can serve as meeting ID. For example, the B1 signal and the meeting ID may be assigned by the conference bridge. In some implementations, a participant ID for the B1 channel owner can serve as a room ID. For example, the B1 participant ID may be unique or assigned by the conference bridge in a reusable way, which may allow for smaller participant IDs and less transmission bandwidth on the B1 channel.

In some implementations, every participant reports meeting ID+room ID+participant ID. This information may be reported to the conference bridge through the A channel or a dedicated control channel. This information may be reported to a central database (e.g., cloud-based server) through a dedicated control channel (e.g., using a TCP session). For example, a participant ID can either be a unique ID (e.g., a MAC address), which may be long, or assigned by the conference bridge, which may be short (e.g., a counter value that is incremented as new participants join the conference call).

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. For example, a non-transitory computer-readable storage medium may include executable instructions that, when executed by a processor, facilitate performance of operations (e.g. operations of the process 1100 of FIG. 11 or the process 1200 of FIG. 12).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A system comprising:
   one or more processors; and
   one or more non-transitory computer-readable media storing computer-executable instructions that, when executed by the one or more processors, cause the one or more processors to perform operations comprising:
      joining a conference call using a network interface;
      accessing an audio signal that has been captured using a microphone;
      receiving, using the network interface, a control channel identifier;
      based at least in part on the control channel identifier, detecting a first control signal in a control channel of the audio signal that is identified by the control channel identifier;
      responsive to detecting the first control signal, invoking modification of an audio path of the conference call; and
      playing a second control signal using a speaker.

2. The system of claim 1, wherein the first control signal was played using a speaker of a computing device that has also joined the conference call.

3. The system of claim 1, further comprising:
   invoking the modification of the audio path of the conference call by transmitting a message to a bridge server of the conference call, the message identifying a group of two or more computing devices that have joined the conference call as sharing an audio environment.

4. The system of claim 3, further comprising:
   responsive to receiving the message, disabling, by the bridge server, a mixing of audio signals received from members of the group into audio signals that the bridge server transmits to members of the group.

5. The system of claim 1, further comprising:
   invoking the modification of the audio path of the conference call by reducing a gain of the speaker.

6. The system of claim 1, further comprising:
invoking the modification of the audio path of the conference call by reducing a gain of the microphone.

7. The system of claim 1, wherein the second control signal is on a same channel as the first control signal.

8. The system of claim 1, wherein the second control signal is on a different control channel than the first control signal.

9. The system of claim 8, wherein the first control signal indicates a presence of a primary device of an audio environment associated with the conference call, and the second control signal indicates a presence of a secondary device of the audio environment associated with the conference call.

10. The system of claim 9, further comprising:
designating the secondary device as a successor to the primary device;
detecting a prolonged absence of the first control signal; and
responsive to detecting the prolonged absence, stop playing the second control signal and start playing a control signal on a same control channel as the first control signal.

11. The system of claim 8, wherein the second control signal indicates a presence of a primary device of an audio environment associated with the conference call, and the first control signal indicates a presence of a secondary device of the audio environment associated with the conference call.

12. The system of claim 1, wherein the audio signal is a first audio signal, and the computer-readable media is further configured to cause the one or more processors to perform acts comprising:
accessing a second audio signal received via the network interface from a bridge server of the conference call;
detecting a second control channel identifier in the second audio signal; and
based at least in part on the second control channel identifier, detecting the first control signal in a control channel of the first audio signal that is identified by the second control channel identifier.

13. The system of claim 12, further comprising:
applying filter to remove a signal encoding the second control channel identifier from the second audio signal to obtain a clean audio signal; and
playing an audio signal based on the clean audio signal using the speaker.

14. The system of claim 1, further comprising:
determining a cross correlation between an audio signal captured using the microphone and an audio signal received via the network interface from a bridge server of the conference call;
based on the cross correlation, detecting an audio feedback loop in the conference call; and
responsive to detecting the audio feedback loop, reducing a volume parameter of a speaker.

15. A method comprising:
joining a conference call using a network interface;
accessing a first audio signal that has been captured using a microphone;
accessing a second audio signal received via the network interface from a bridge server of the conference call;
detecting a control channel identifier in the second the audio signal;
based at least in part on the control channel identifier, detecting a first control signal in a control channel of the first audio signal that is identified by the control channel identifier;
responsive to detection of the first control signal, invoking modification of an audio path of the conference call; and
playing a second control signal using a speaker.

16. The method of claim 15, wherein the first control signal was played using a speaker of a computing device that has also joined the conference call.

17. The method of claim 15, wherein the modification of the audio path of the conference call comprises:
transmitting a message to a bridge server of the conference call that identifies a group of two or more computing devices that have joined the conference call as sharing an audio environment.

18. The method of claim 15, wherein invoking the modification of the audio path of the conference call comprises muting the speaker.

19. The method of claim 15, wherein invoking the modification of the audio path of the conference call comprises muting the microphone.

20. The method of claim 15, wherein the second control signal is on a same control channel as the first control signal.

21. The method of claim 15, wherein the second control signal is on a different control channel than the first control signal.

22. The method of claim 21, wherein the first control signal indicates a presence of a primary device of an audio environment associated with the conference call, and the second control signal indicates a presence of a secondary device of the audio environment associated with the conference call.

23. The method of claim 22, further comprising:
designating the secondary device as a successor to the primary device;
detecting a prolonged absence of the first control signal; and
responsive to detection of the prolonged absence, stop playing the second control signal and start playing a control signal on a same control channel as the first control signal.

24. The method of claim 21, wherein the second control signal indicates a presence of a primary device of an audio environment associated with the conference call, and the first control signal indicates a presence of a secondary device of the audio environment associated with the conference call.

25. The method of claim 15 further comprising:
applying a filter to remove a signal encoding the control channel identifier from the second audio signal to obtain a clean audio signal; and
playing an audio signal based on the clean audio signal using a speaker.

26. The method of claim 15, further comprising:
receiving, using the network interface, a control channel identifier; and
based on the control channel identifier, detecting the first control signal in a control channel of the audio signal that is identified by the control channel identifier.

27. The method of claim 15, further comprising:
determining a cross correlation between an audio signal captured using the microphone and an audio signal received via the network interface from a bridge server of the conference call;
based on the cross correlation, detecting an audio feedback loop in the conference call; and
responsive to detection of the audio feedback loop, reducing a volume parameter of a speaker.

28. A non-transitory computer-readable storage media storing computer-executable instructions that, when executed by a processor, cause the processor to perform operations comprising:
- joining a conference call using a network interface;
- accessing an audio signal that has been captured using a microphone;
- detecting a first control signal in the audio signal, wherein the first control signal indicates a presence of a primary device of an audio environment associated with the conference call;
- responsive to detection of the first control signal, invoking modification of an audio path of the conference call;
- playing a second control signal using a speaker, wherein the second control signal is on a different control channel than the first control signal and indicates a presence of a secondary device of the audio environment associated with the conference call;
- detecting a prolonged absence of the first control signal; and
- based at least in part on the prolonged absence, stop playing the second control signal and start playing a control signal on a same control channel as the first control signal.

29. The non-transitory computer-readable storage media of claim 28, wherein the first control signal was played using a speaker of a computing device that has also joined the conference call.

30. The non-transitory computer-readable storage media of claim 28, wherein invoking the modification of the audio path of the conference call comprises:
- transmitting a message to a bridge server of the conference call that identifies a group of two or more computing devices that have joined the conference call as sharing an audio environment.

31. The non-transitory computer-readable storage media of claim 28, wherein invoking the modification of the audio path of the conference call comprises muting the speaker.

32. The non-transitory computer-readable storage media of claim 28, wherein invoking modification of the audio path of the conference call comprises muting the microphone.

33. The non-transitory computer-readable storage media of claim 28, wherein the second control signal is on a same control channel as the first control signal.

34. The non-transitory computer-readable storage media of claim 28, wherein the second control indicates a presence of a primary device of an audio environment associated with the conference call, and the first control signal indicates a presence of a secondary device of the audio environment associated with the conference call.

35. The non-transitory computer-readable storage media of claim 28, wherein the audio signal is a first audio signal, the operations further comprising:
- accessing a second audio signal received via the network interface from a bridge server of the conference call;
- detecting a control channel identifier in the second audio signal; and
- based at least in part on the control channel identifier, detecting the first control signal in a control channel of the first audio signal that is identified by the control channel identifier.

36. The non-transitory computer-readable storage media of claim 35, storing computer-executable instructions that, when executed by a processor, cause the processor to perform operations comprising:
- applying a filter to remove a signal encoding the control channel identifier from the second audio signal to obtain a clean audio signal; and
- playing an audio signal based on the clean audio signal using a speaker.

37. The non-transitory computer-readable storage media of claim 28, storing computer-executable instructions that, when executed by a processor, cause the processor to perform operations comprising:
- receiving, using the network interface, a control channel identifier; and
- based at least in part on the control channel identifier, detecting the first control signal in a control channel of the audio signal that is identified by the control channel identifier.

38. The non-transitory computer-readable storage media of claim 28, storing computer-executable instructions that, when executed by a processor, cause the processor to perform operations comprising:
- determining a cross correlation between an audio signal captured using the microphone and an audio signal received via the network interface from a bridge server of the conference call;
- based on the cross correlation, detecting an audio feedback loop in the conference call; and
- responsive detection of the audio feedback loop, reducing a volume parameter of a speaker.

* * * * *